(12) United States Patent
Balmin et al.

(10) Patent No.: US 7,315,852 B2
(45) Date of Patent: Jan. 1, 2008

(54) XPATH CONTAINMENT FOR INDEX AND MATERIALIZED VIEW MATCHING

(75) Inventors: Audrey L. Balmin, San Diego, CA (US); Kevin S. Beyer, San Jose, CA (US); Roberta Jo Cochrane, Los Gatos, CA (US); Fatma Ozcan, San Jose, CA (US); Mir Hamid Pirahesh, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 10/698,622

(22) Filed: Oct. 31, 2003

(65) Prior Publication Data

US 2005/0097084 A1 May 5, 2005

(51) Int. Cl.
*G06F 17/30* (2006.01)
(52) U.S. Cl. .................... 707/3; 707/4; 707/5; 707/6
(58) Field of Classification Search ............ None
See application file for complete search history.

(56) References Cited

U.S. PATENT DOCUMENTS

| | | | |
|---|---|---|---|
| 6,182,029 B1 | 1/2001 | Friedman | |
| 6,339,776 B2 | 1/2002 | Dayani-Fard et al. | |
| 6,401,241 B1 | 6/2002 | Taylor | |
| 6,466,940 B1 | 10/2002 | Mills | |
| 6,538,673 B1 | 3/2003 | Maslov | |
| 6,549,922 B1 | 4/2003 | Srivastava et al. | |
| 6,850,933 B2* | 2/2005 | Larson et al. | 707/102 |
| 2002/0138353 A1* | 9/2002 | Schreiber et al. | 705/26 |
| 2002/0170070 A1 | 11/2002 | Rising, III et al. | |
| 2003/0088558 A1 | 5/2003 | Zaharioudakis et al. | |
| 2003/0212670 A1* | 11/2003 | Yalamanchi et al. | 707/3 |
| 2004/0010752 A1* | 1/2004 | Chan et al. | 715/513 |
| 2004/0010754 A1* | 1/2004 | Jones | 715/513 |
| 2004/0068487 A1* | 4/2004 | Barton et al. | 707/3 |

FOREIGN PATENT DOCUMENTS

EP    1280053    1/2003

OTHER PUBLICATIONS

Cheng et al., "XML and DB2", IBM Santa Teresa Laoratory, Proc. of 16th Intern. Conference on Data Engineering, Feb. 2000, pp. 1-5.

(Continued)

*Primary Examiner*—Jeffrey Gaffin
*Assistant Examiner*—Tomasz Ponikiewski
(74) *Attorney, Agent, or Firm*—Gibb & Rahman, LLC

(57) ABSTRACT

A method for using pre-computed information stored in auxiliary structures to speed up processing of expensive queries on hierarchical documents such as XML documents being queried using XPath. The invention defines a taxonomy of such structures such as indexes and materialized views for storing pre-computed XPath results (PXRs), determines what portion of the query can be evaluated by the structures, and computes the compensation for the results generated by the structures. The invention detects all structures applicable to the query and rewrites the query to use such structures, speeding up the performance of the queries. The invention identifies the matching structures by detecting containment mappings between XPath expressions in the query and the structure. The invention also includes a new representation for XPath expressions that is rich enough to express all features of XPath.

60 Claims, 12 Drawing Sheets

OTHER PUBLICATIONS

Neven, "Automata Theory for XML Researchers", Database Principles, vol. 31, No. 3, Sep. 2002, pp. 39-46.

Braga et al., "A Tool for Extracting XML Association Rules", Proc. of the 14th IEEE Confer. on Tools with Artificial Intelligence, 2002, pp. 57-64.

Balmin et al., "XPath Query Containment for Index and Materialized View Matching," Nov. 2002, pp. 1-12.

Miklau et al., "Containment and Equivalence for an XPath Fragment", ACM PODS, Jun. 2002, pp. 65-76.

* cited by examiner

| | | |
|---|---|---|
| 1 | $matchStep(p,q)$ | |
| 1.1 | if $(q = q_1 \wedge q_2)$ | $matchStep(p,q) \to matchStep(p,q_1) \vee matchStep(p,q_2)$ |
| 1.2 | else if $(q = q_1 \vee q_2)$ | $matchStep(p,q) \to matchStep(p,q_1) \wedge matchStep(p,q_2)$ |
| 1.3 | else if $(p_{axis} =$ "descendant") | $matchStep(p,q) \to \bigvee \{matchChildren(p,c)\}, \forall c \in \{$ preorder traversal of $q\}$, such that $c_{axis} \neq$ "attribute" |
| 1.4 | else if $(p_{axis} = q_{axis})$ | $matchStep(p,q) \to matchChildren(p,q)$ |
| 1.5 | else | $matchStep(p,q) \to False$ |
| 2 | $matchChildren(p,q)$ | |
| 2.1 | if $(p_{test} =$ "*") $\vee (p_{test} = q_{test})$ | $matchChildren(p,q) \to matchPred(p_{pred},q) \wedge matchNext(p_{next},q))$ |
| 2.2 | else | $matchChildren(p,q) \to False$ |
| 3 | $matchPred(p_{pred},q)$ | |
| 3.1 | if $(p_{pred} = $ null$)$ | $matchPred(p_{pred},q) \to True$ |
| 3.2 | else if $(q = $ null$)$ | $matchPred(p_{pred},q) \to False$ |
| 3.3 | else if $(p_{pred} = p_1 \wedge p_2)$ | $matchPred(p_{pred},q) \to matchPred(p_1,q) \wedge matchPred(p_2,q)$ |
| 3.4 | else if $(p_{pred} = p_1 \vee p_2)$ | $matchPred(p_{pred},q) \to matchPred(p_1,q) \vee matchPred(p_2,q)$ |
| 3.5 | else | $matchPred(p_{pred},q) \to matchStep(p_{pred},q_{pred}) \vee matchStep(p_{next},q)$ |
| 4 | $matchNext(p_{next},q)$ | |
| 4.1 | if $(p_{next} = $ null$)$ | $matchNext(p_{next},q) \to True$ |
| 4.2 | else if $(q = $ null$)$ | $matchNext(p_{next},q) \to False$ |
| 4.3 | else | $matchNext(p_{next},q) \to matchStep(p_{next},q_{next}) \vee matchStep(p_{next},q)$ |

FIG. 4

ExtractPredicates(E)

foreach c in breadth-first traversal of E do if (c ∈ <, ≤, >, ≥, =, ≠) then

// left extraction point lep = c.left;

if (lep is an XPS) // traverse next's while (lep.next ≠ null) lep=lep.next;

// right extraction point rep=c.right;

if (rep is an PS) // traverse next's while (rep.next ≠ null) rep=rep.next;

add "c (lep, rep)" to the *filter* list if (lep is a const) ∧ (rep is an XPS)

replace c with the right child if (rep is a const) ∧ (lep is an XPS)

replace c with left child if (lep is an XPS) ∧ (rep is an XPS)

replace comparison in c with AND

FIG. 7

| REF/VALUE | PATH | TYPED VALUE |
|---|---|---|
| REF1 | /A/B/C | 5 |
| REF2 | /A/C | 6 |
| ... | ... | ... |

FIG. 10

| Entry | PXR content | Extra Navigation | Predicates | Name/Ancestors |
|---|---|---|---|---|
| 1 | (NR) | Forward/Reverse | As residual | As residual |
| 2 | (DR) | Full Query | Full Query | Full Query |
| 3 | (copy) | Forward | Below QEP, as residual | No |
| 4 | (NR, path) | Forward/Reverse | As residual | As pushdown |
| 5 | (DR, path) | Full Query | Full Query | As pushdown |
| 6 | (copy, path) | Forward | Below QEP, as residual | As pushdown |
| 7 | (NR, value) | Forward/Reverse | As pushdown | As residual |
| 8 | (DR, value) | Full Query | As pushdown | Full Query |
| 9 | (copy, value) | Forward | As pushdown | Below QEP, as residual |
| 10 | (NR, path, value) | Forward/Reverse | As pushdown | As pushdown |
| 11 | (DR, path, value) | Full Query | Full Query | As pushdown |
| 12 | (copy, path, value) | Forward | As pushdown | As pushdown |

FIG. 11

XPATH CONTAINMENT FOR INDEX AND MATERIALIZED VIEW MATCHING

CROSS REFERENCE TO RELATED APPLICATIONS

The present application is related to pending U.S. patent application Ser. No. 09/725,363, filed Nov. 29, 2000, entitled "XML DOCUMENT PROCESSING," having U.S. patent application Ser. No. 09/652,328, filed Aug. 30, 2000, entitled "SYSTEM AND METHOD FOR QUERY PROCESSING AND OPTIMIZATION FOR XML REPOSITORIES," having U.S. patent application Ser. No. 10/375,970, filed Feb. 28, 2003, entitled "XPATH EVALUATION METHOD, XML DOCUMENT PROCESSING SYSTEM AND PROGRAM USING THE SAME" having and U.S. patent application Ser. No. 10/287,924, filed Nov. 5, 2002, entitled "OPTIMIZING CORRELATED QUERIES USING AUTOMATIC SUMMARY TABLES", having. The foregoing applications are commonly assigned to the present assignee, and are all incorporated herein by reference.

BACKGROUND OF THE INVENTION

1. Field of the Invention

The present invention generally relates to the querying of hierarchical documents, for example XML documents queried using the XPath language. More specifically, the invention determines whether pre-computed information stored in structures such as materialized views and indexes can accelerate query processing.

2. Description of the Related Art

XML is becoming increasingly popular for representing and exchanging large amounts of data, particularly with respect to the internet. XML documents are one type of self-describing structured document. Consequently, there is a pressing need to persistently store and efficiently query these documents. To address this need, W3C has proposed an XML query language, XQuery [30]. Simultaneously, ANSI and ISO are defining SQL/XML, a new part of the SQL standard that extends SQL to handle XML data [26]. SQL/XML defines XML as a new SQL data type, and provides a set of functions to create, manipulate, and query XML data.

XPath [29] is a widely accepted W3C standard language for navigating and extracting fragments of XML documents, for both the XQuery and the SQL/XML query languages, and is employed by other XML related technologies such as XSLT and XPointer. The XPath 2.0 data model is based on the notion of sequences, which are ordered collections of zero or more items. An item might be one of the seven types of nodes [31], or a simple value, as defined in the XML Schema [28] specification. XPath 2.0 is designed to be embedded in a host language such as XQuery, XSLT or SQL/XML. It is a reference based language. Hence, subsequent expressions on the results an XPath expression may traverse the document both in reverse and forward direction.

The fundamental constructs of this language are path expressions, which are used to locate nodes in an XML tree (in this application, we only consider XML in the form of trees, and do not address idrefs). An XPath expression consists of a set of steps, and each step has an axis, a test, and probably some predicates, which can include conjunction and disjunction and can be arbitrarily complex. XPath defines a full set of axes for traversing XML trees in forward (child, descendant, attribute, etc) or reverse (parent, ancestor, etc) direction. A node test is either a node kind test, or a name test and must be true for the node to be selected. A predicate can be a conjunction or a disjunction of comparison predicates, nested path expressions, or any other complex expression. The result of a path expression is a sequence of node references.

SQL/XML [10, 26, 25] is a new extension to the SQL standard which proposes a new data type called XML and several functions to create, search, manipulate and extract XML. It supports a new SQL data type with a set of functions that operate on this type. A valid instance of the XML data type can be a well-formed XML document with its prolog, an XML element node, textual content, or it can be a forest of element nodes. SQL/XML defines several functions to create XML data, as well as to publish relational data as XML. It also provides mechanisms to check and enforce DTD or schema compliance.

SQL/XML [25] has also outlined a set of functions to query and manipulate XML data, to extract XML values, and to convert XML values into text. XMLContains is a scalar boolean function which takes an XML value, and a XPath expression as input, and returns true if the result of the XPath expression when executed on the input XML value is a non-empty sequence, and returns false otherwise. Similarly, XMLExtract is also a scalar function that takes the same set of arguments as XMLContains, but returns an XML value which is the result of the input XPath expression when executed on the input XML value. XMLExtract function actually extracts the result and creates a new XML data value. The result of an SQL/XML query is an instance of the SQL data model, which now allows XML as a valid data type.

In addition to XPath's utility for querying XML data, XPath expressions are also used to describe XML indexes. Accessing XML data often requires complicated navigation into the document, resulting in computationally expensive query processing. As a result, optimization of XPath expressions is vital to efficient processing of XML queries. Regular path queries are the main building blocks of XPath expressions. Rewriting and optimization of regular path queries has been studied in [14, 4, 5]. However, this work only considers linear paths, and hence those techniques are not applicable to complex XPath expressions involving nested predicates and branching.

Several recent papers explored indexing XPath expressions over XML data [24, 23, 17, 8, 12, 20, 15]. Much of this work assumed that every node is indexed, and ignored index maintenance costs. Some previous indexing work directly addressed indexing patterns. For example, in [19] the T-index was defined with a non-branching path expression and a matching algorithm was proposed, which was subsequently extended by [18].

In [18], "Containment and Equivalence for an XPath Fragment", ACM PODS 2002, Jun. 3-6, 2002, Madison Wis., p. 65-76, which is hereby incorporated by reference, authors Gerome Miklau and Dan Suciu note that optimization of XPath expressions can be accomplished using an algorithm for containment. In other words, if it is known from the XPath expression describing a document fragment that the fragment contains the data required to answer a query, that knowledge can be exploited to avoid expensive navigation and query processing. For example, if the XPath expression indicates the document fragment contains P=/a// b, then this fragment can be used to answer the query Q=/a/b, but cannot be used to answer the query Q=/a//d. XPath query containment has also been studied by [9, 21].

Miklau and Suciu found that even for XP{//,*,[ ]}, which is a subset of XPath containing descendant edges, star nodes, and branching, query containment is co-NP complete. They proposed a representation for XPath expressions and a sound but incomplete algorithm which uses tree mappings. They do not distinguish between next steps and predicates, and their representation is unfortunately not able to express disjunction, or comparison predicates, or any axis other than child or descendant.

Neven [21] has shown that adding disjunction does not increase computational complexity of the containment problem, but did not provide any algorithms for deciding the containment. Neven also proved that even with a very simple form of negation, the problem becomes undecidable.

An improved method of exploiting information regarding XPath expression containment is therefore needed to more efficiently query XML documents.

SUMMARY OF THE INVENTION

The invention speeds up the processing of potentially expensive queries on hierarchical documents by using pre-computed information stored in auxiliary structures. The hierarchical documents are typically XML documents being queried using XQuery or SQL/XML query languages. The auxiliary structures may include materialized views and indexes, and the pre-computed information may include XPath expression results. The invention defines a taxonomy of structures for storing pre-computed XPath results (PXRs). The invention determines what portion of the query can be evaluated by the index or materialized view and computes the compensation for the index or materialized view, which defines how the pre-computed results can be exploited to compute the whole query result.

Thus, given an XPath index definition and a query containing XPath expressions, the invention identifies the portion of the query that can be answered by the index, as well as the XPath expression needed to compute the query result. Similarly, given a materialized XML view definition containing XPath expressions and a user query, the invention determines if the view can be used to answer the query, and computes the compensation and rewrites the query accordingly.

The invention represents the XPath expression as a tree of XPath steps, where each of the XPath steps comprises an XPath step node having axis data, test data, predicate data, and next XPath step node data. The invention identifies the matching indexes or materialized views by detecting containment mappings between XPath expressions in the query and the index or materialized view. Containment mapping detection comprises traversing the tree of XPath steps (typically from the top down) and, during the traversing, matching axis data, test data, predicate data, and next XPath step node data with index or materialized view XPath expressions. For each such match identified, the invention computes an XPath expression to be applied to the index or materialized view, as well a compensation XPath expression to be applied as a residual query.

The invention chooses only those indexes and materialized views which subsume portions of the user query, guaranteeing that the user does not get any invalid answers. The invention computes the query, $Q_1$, to be pushed down to the index, making sure that the index contains the answer to $Q_1$. The invention also computes the compensation to apply to the results of indexes and materialized views, hence guaranteeing that the user gets the same set of answers, whether or not indexes and materialized views are used to answer the query. Conjunctions and disjunctions are permitted in the tree of XPath steps if at least one disjunction in the materialized view exists within the query and the materialized view maps to at least one node other than the disjunct of the query. The invention also handles comparison predicates; predicate conditions are moved into filter expressions before the match identifying process begins.

The invention also includes a new representation for XPath expressions that is rich enough to express all features of XPath. The invention handles a much more functional subset of XPath, including include all XQuery axes, branching, wild cards, and arbitrarily nested predicates.

The invention can also be used to identify applicable full-text indexes when such indexes are defined on fragments of XML documents using XPath expressions, and when such indexes are defined to contain only values of a certain datatype.

These and other aspects and objects of the present invention will be better appreciated and understood when considered with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

The invention will be better understood from the following detailed description with reference to the drawings, in which:

FIG. 4 is a table of rules for finding containment mappings between expression trees, according to a preferred embodiment of the invention;

FIG. 7 is a diagram of an algorithm to extract filters from an expression tree, according to a preferred embodiment of the invention;

FIG. 10 is a table of pre-computed results, according to a preferred embodiment of the invention;

FIG. 11 is a table of classification of compensation for the PXR taxonomy, according to a preferred embodiment of the invention (NR=node reference, DR=document reference, path=full linear path to nodes, value=typed value)

DETAILED DESCRIPTION OF THE INVENTION

Figure 1:
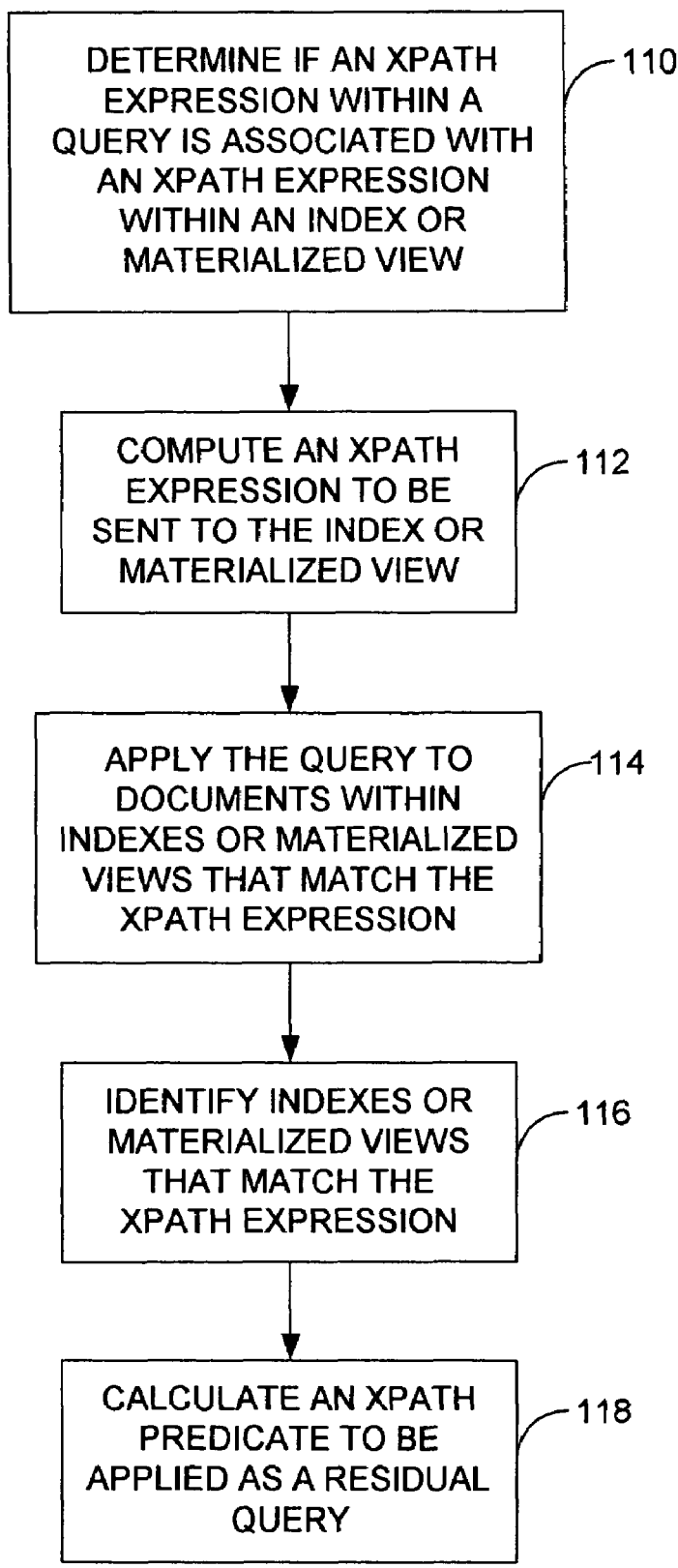
FIG. 1 is a flow diagram illustrating the major aspects of a preferred embodiment of the invention.

The invention addresses the problem of XPath query containment for XML index and materialized view matching. Given an XML index definition expressed in XPath, and a query containing XPath expressions, the invention determines if the index is usable. If so, the invention computes the XPath expression to be evaluated, as well as the XPath predicate to be applied as the residual. Similarly, given a materialized view definition containing XPath expressions and a user query, the invention checks if the materialized view can be used to answer the query, and computes the compensation and rewrites the query accordingly.

Different structures that contain pre-computed XPath results are explored, and exploited for efficient processing of XML queries containing path expressions. Materialized views and indexes, used in optimization of expensive queries, are two pre-computation structures known in relational literature [6, 13, 27, 32] and commercially available in many products. The use of indexes and materialized views dramatically improves the response time of query processing. To facilitate a fast search, XML data type, like many other data types, requires multiple access paths in the form of pre-computed XPath expressions such as indexes.

If auxiliary information including the results of pre-computed XPath expressions is stored, that information can extend the class of queries that can exploit these results. The invention creates a taxonomy of pre-computed XPath results (PXRs) that identifies auxiliary information that can be stored, and how this information can be exploited. XPath query containment is a necessary condition to determine if a PXR can be used to answer a query. A PXR can answer an XPath query only if the PXR contains the data required by the query.

One important subset of such PXRs is the set of XML views. Although views are essential to any query language, XML views are yet to be defined in XQuery. There has been some work on XML views, which precede both XQuery and SQL/XML standards. When XML data is extracted from the Web, then a materialized view not only expedites processing, but also provides higher availability. In this scenario, the data may not conform to a fixed schema. This application describes efforts to investigate when XML views are usable to answer a user query, and to extend the matching framework of the IBM Corporation's DB2™ database to handle SQL/XML views containing XPath expressions.

XML indexes form another important subset of PXRs. Persistent stores of XML documents will contain a large number of nodes (billions, potentially). Therefore, it is not practical to fully index all of the documents, which would roughly correspond to indexing every column of every table in a relational store. Hence, only partial XML indexes defined by a set of XPath expressions are considered. In this context, XML indexes may be viewed as storing pre-computed results of XPath expressions, as they support direct access to individual nodes in an XML document that otherwise can be retrieved by XPath navigation. Note that no new index scheme is proposed, but rather a technique for utilizing a partial index. The invention is complimentary to the various index schemes [19, 8, 17, 15, 24, 23] recently proposed in the literature.

As XPath query containment is a necessary condition to use any PXR, the invention includes an XPath containment algorithm, which handles a large subset of XPath expressions, including value based comparison predicates, conjunction and disjunction, "self" and "parent" axes. The containment algorithm uses a tree representation of XPath expressions and computes a mapping from PXR nodes to the query nodes. The algorithm is an extension of earlier work on XPath containment [18] which also uses tree mappings, but which handles only a very restricted class of XPath expressions. As opposed to earlier approaches to XPath optimization, [3, 14, 11, 1], the invention does not use any XML schema or DTD because many documents which are streamed from the Web either do not have a schema, or each one has a different schema, resulting in schema chaos.

After defining a PXR taxonomy, and identifying the cases which require compensation, the invention classifies which compensating expressions can be handled by the PXR, and which need to be executed as residual. The invention uses the mapping information produced by the containment algorithm to compute pushdown and residual compensating expressions.

In addition to deciding containment, the primary focus of earlier work [20, 23], the invention must also compute compensation in order to use PXRs to answer queries. As a result, the invention needs to compute all mappings so that it can compute the optimal compensation. Each PXR has different capabilities that affect the compensation computation. This application focuses on some instances of the PXR taxonomy, namely SQL/XML views, and partial XML indexes, and describes different algorithms to build the compensation for these PXRs.

As customary, XML is described as labeled ordered trees. The nodes of the tree correspond to XML elements, and are labeled with the tags of the corresponding elements. Tags that start with the "@" symbol stand for attributes. Leaf nodes may also be labeled with typed values that correspond to the text content.

FIG. 1 provides an overview of the major aspects of a preferred embodiment of the invention. In step 110, the invention determines if an XPath expression within a query is associated with an XPath expression within an index or materialized view. Next, the invention computes an XPath expression to be sent to the index or materialized view. Then, in step 114, the invention applies the query to those documents within indexes or materialized views that match the XPath expression. The invention then identifies those indexes or materialized views that match the XPath expression in step 116. Finally, in step 118 the invention calculates an XPath predicate to be applied as a residual query.

Figure 2:
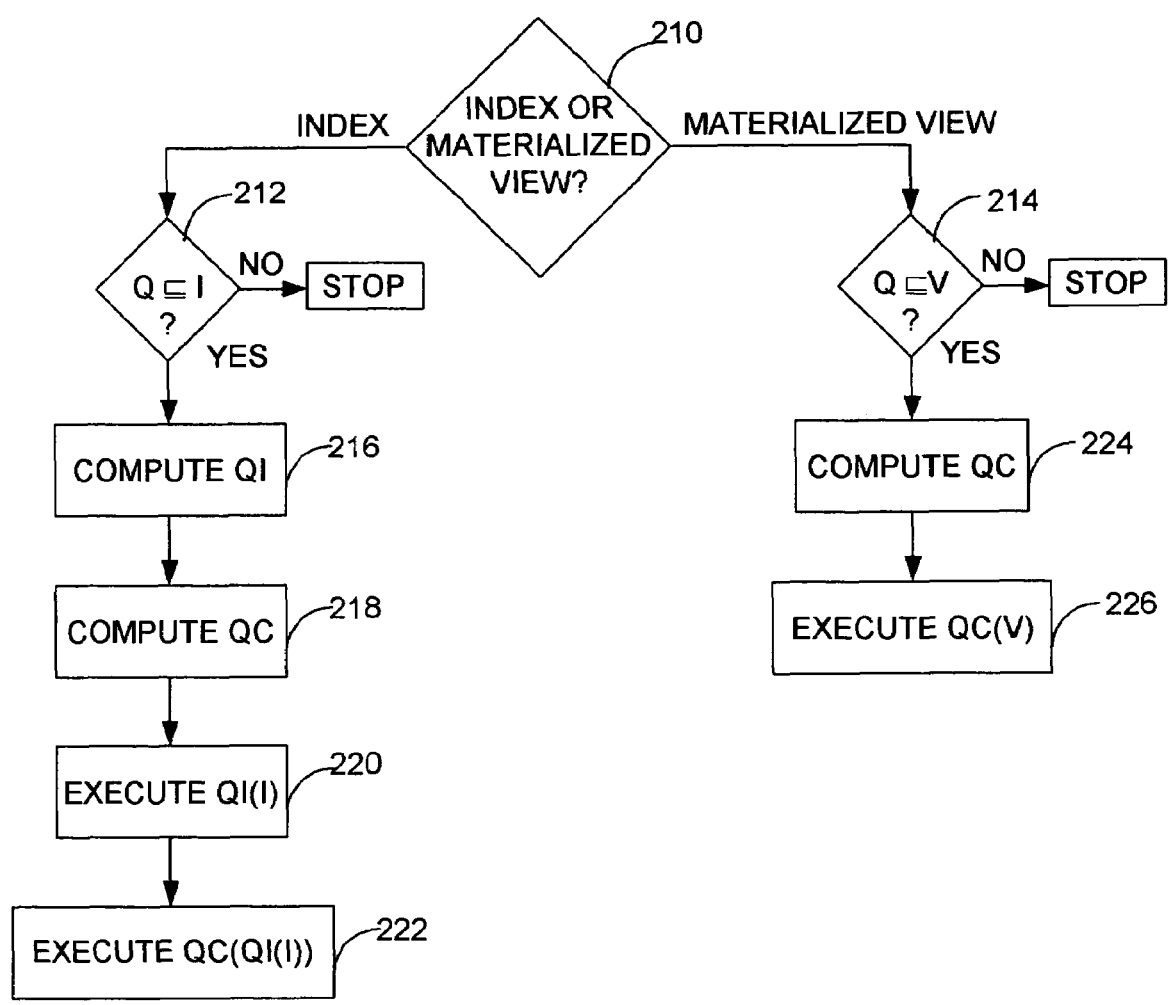
FIG. 2 is a flow diagram illustrating the use of indexes and materialized views for query processing, according to a preferred embodiment of the invention.

In its most general form, as shown in the flowchart in FIG. 2, the invention first determines in step 210 if an XPath expression within a query is contained within an XML index (step 212) or a materialized view (step 214). To match an index I, the invention decomposes the original XPath query Q(D) on the base data D into two parts: the index query $Q_I$ (step 216), and the compensating query $Q_C$ (step 218) such that $Q_C(Q_I(I))=Q(D)$. At runtime, an index manager evaluates $Q_I$ using the index (step 220) and then $Q_c$ is evaluated over the index result (step 222). For a materialized view V, the invention computes a compensating XPath expression $Q_C$ (step 224) such that $Q_c(V)=Q(D)$. At runtime, $Q_c$ is evaluated over the data stored in the view (step 226).

The invention solves two related problems for a large subset of XPath language. The first is the index matching problem. Given an index definition I written in XPath and an XPath query Q, the invention determines if I can be used to answer Q (i.e., Q is contained I), and computes $Q_I$ which is the part of Q that can be evaluated by the index. The index structure returns a set of node references into original XML data, satisfying $Q_I$, to obtain the final result.

The second problem is the materialized view matching problem. Given a materialized view definition V expressed in a language that contains XPath expressions and a user query Q, the invention determines if V can be used to answer Q, and computes a compensation query $Q_C$ such that $Q_c(Q_I(I))=Q(D)=Q_C(V)$.

To meet both index and materialized view matching problems, the invention first decides the XPath query containment problem, which is defined as follows. Given two XPath expressions V and Q, Q is contained in V, if every XML node returned by Q is also returned by V. The existing XML management system's index and materialized view matching framework does not understand the details of XPath expressions. Hence, the invention includes a special methodology to detect containment mappings between XPath expressions. Furthermore, for materialized view matching, XPath containment is not a sufficient condition, because XPath expressions contain projection (head expressions) as well as selection (predicate expressions). The invention therefore considers what has been extracted in the materialized view when computing the compensation.

Definition 1 XML document An XML document is a tree where
1. Every node has a label 1 coming from the set of element tags L.
2. Every atomic node has an additional labels v, coming from the set of values V, and t, coming from the set of data types T. Atomic nodes can only be leafs of the document tree. (However, not every leaf has to be an atomic node. Leafs can also be empty elements.)

The invention represents XPath expressions as labeled binary trees, called XPS trees. A node of an XPS tree can be a conjunction (and), a disjunction (or), a comparison operator ($<$, $\leq$, $\geq$, $>$, $=$, $\neq$), a constant, or an XPath Step (XPS) node. Each XPath step node, XPS(axis, test, predicate, next) comprises axis data, test data, predicate data, and next XPath step node data. Axis is either the special "root", or one of the 6 axes allowed in XQuery [30]: "child", "descendant", "self", "attribute", "descendant-or-self", or "parent". One of ordinary skill in the art can extend this to all 13 axes in XPath. Although the XPath standard does not include an explicit root axis, the invention chooses to express the root explicitly to distinguish between absolute and relative path expressions. The test is either a name test, a node( ) test, a text( ) test, or a wildcard symbol "*".

The first child of an XPS node is called predicate. Predicate is an expression tree which may contain logical expressions, comparisons, and existential path expressions. Predicates may also contain arithmetic expressions. The second child, called next, points to the next step, and is always an XPS node. Next and predicate are optional. "Null" nodes denote missing children. An XPS node which does not have a next step, and is reachable through next steps only, i.e. without following any predicate steps, is called the extraction point, since this node extracts the result of the XPath. An XPath expression tree might contain multiple next steps, and hence represent multiple extraction points. For the purposes of the containment methodology, the invention assumes there is only one extraction point, though one of ordinary skill in the art can extend this to cover multiple extraction points. Example XPS trees can be found in FIG. 3.

XPS tree Q is evaluated against a document tree D by producing all possible bindings μ, which are mappings of nodes of the XPS tree into the nodes of query tree. Each binding has to be root preserving, respect node and edge labels of the query, and the value of the atomic elements have to satisfy value based predicates of Q. XPS nodes can also be used to represent variable bindings.

Definition 2 (Witness Tree, Result Element)
For each binding there exists unique minimal tree w∈D, called the witness tree, such that w contains all nodes of D that occur in μ and the root of D. Each witness tree has a distinguished result element, which is the document tree node mapped by the extraction point of the XPS tree. The result of Q(D) is defined as a set of all witness trees with their result elements.

Query containment is a necessary condition for determining if a pre-computed result (PXR) can be used to answer an XPath query. Two definitions of XPS tree containment are provided that correspond to the cases of XML indexes and materialized views, respectively. The first definition assumes that the PXR contains references to the result elements within the original document, which corresponds to the data access that employs XML indexes. This definition is equivalent to the one used in [18].

Definition 3 (Witness Tree Containment)
XPS tree Q is WT-contained in XPS tree I, denoted $Q \subseteq^{WT} I$, if and only if, for any document D and any witness tree $w_Q$ of Q(D), there exists a witness tree $w_I$ of I(D), such that $w_I$ is a subtree of $w_Q$ (i.e. every node of $w_I$ is present in $w_Q$).

This definition is a natural extension of the one used by Miklau and Suciu [18]. They define the result of a query to be boolean, i.e. Q(D)=true if there exists at least one witness tree, Q(D)=false otherwise. They define query containment as $Q \subseteq I$ iff $\forall D, I(D) \rightarrow Q(D)$.

The second definition is useful in case of materialized views when parts of the documents are copied to the view and are not connected to the original document.

Definition 4 (Result Element Containment)
XPS tree Q is RE-contained in XPS tree V, denoted $Q \subseteq^{RE} V$, if and only if, for any document D and any result element $e_Q$ of Q(D), there exists a result element $e_v$ of V (D), such that $e_v = e_Q$ or $e_v$ is an ascendant of $e_Q$.

Notice that, the RE-containment is more restrictive than the WT-containment. That is, for any Q and V, if $Q \subseteq^{RE} V$, then $Q \subseteq^{WT} V$.

XPath Query Containment Algorithm
An algorithm to compute containment mappings between two XPath expressions is now described. Containment is a necessary condition for determining if a pre-computed result (PXR) can be used to answer an XPath query.

The containment algorithm traverses both the PXR and the query trees, and tries to find a mapping from PXR nodes to query nodes. For the ease of readability, we denote the XPath expression defining the PXRs with P, and the user query with Q. The basic algorithm is described first, followed by an extension to handle comparison predicates. Then a mapping structure is defined that is required to deploy containment in the context of the framework defined below.

Basic Containment Algorithm
The invention computes WT containment of XPS trees by computing all possible tree mappings from XPS nodes of P into the XPS nodes of Q, in a single top-down pass of the P tree. The invention detects containment mappings between XPath expressions in the query and the index or materialized view by traversing the tree of XPath steps from the top down and, during the traversing, and matching axis data, test data, predicate data, and next XPath step node data with index or materialized view XPath expressions. (Before the matching process, the predicate conditions are moved into filter expressions.) The invention combines structural containment and predicate subsumption to detect containment of a large set of XPath expressions. The algorithm serves two purposes. First, if at least one mapping is found it shows that Q is contained in P, as observed in [18]. Second, the mappings produced by the algorithm are later used to derive the compensation necessary to compute Q.

The definition of containment mapping for $XP^{\{//,[\ ],*\}}$ subset of XPath, as defined by Miklau and Suciu [18], is adapted to the richer XPS tree notation. This subset allows only "child" and "descendant" axes, and predicate subtrees may contain only existential tests and conjunctions. XPS trees that support this subset are called "conjunctive".

Definition 5 (Conjunctive Containment Mapping)

Given two conjunctive XPS trees Q and P, Q is conjunctively-contained in P, if there is a total mapping of XPS nodes of P onto XPS nodes of Q, denoted by $M(P, Q)=f\{(p_1, q_1), \ldots, (p_n, q_n)\}$, such that $\forall (p, q) \in M$ the following holds:
$p_{test}$="*" or $p_{test}=q_{test}$
$p_{axis}=q_{axis}$, or $p_{axis}$="descendant" and $q_{axis}$="child".
if $p_{axis}$="child", then $(p^{parent}; q^{parent}) \in M$, where $p^{parent}$ is the lowest XPS ancestor of p.
if $p_{axis}$="descendant", then $\exists q^{anc}$; $(p^{parent}; q^{anc}) \in M$, where $q^{anc}$ is an XPS ancestor of q The basic observation for this mapping is that given two conjunctive XPath trees P and Q, $Q \subset P$ if there exists a total root preserving mapping, which respects axes and test labels. Next, the above definition is extended to XPS trees containing disjunction.

Definition 6 (Containment Mapping)

Given two XPS trees Q and P containing disjunctions, let Q' and P' be conjunctive XPS trees obtained from Q and P respectively, by non-deterministically replacing each disjunction (or) node with one of its operands. $Q \subset P$ if $\exists P'$, such that $\forall Q'$, Q' is conjunctively-contained in P'. Mapping M(P, Q) is defined to be a union of all M(P', Q').

Disjunction is handled by the above definition since, if the invention converts Q and P into a disjunctive normal form (DNF), and one of the disjuncts of P contains all disjuncts of Q, then Q can be answered using the results in P that satisfy this disjunct.

FIG. 4 provides an equivalent procedural definition of containment. Every function of the table evaluates to boolean. The algorithm is invoked by the initial call matchStep (p_root, q_root), and there exists at least one containment mapping if this call evaluates to true.

The rules for each function are applied in the order they appear, and once a rule fires, the subsequent rules are not checked. For instance, if the rule 1.3 for matchStep( ) is applicable (i.e., its condition holds), the rule 1.4 will not be tried, even though these two rules are not mutually exclusive.

Figure 3:
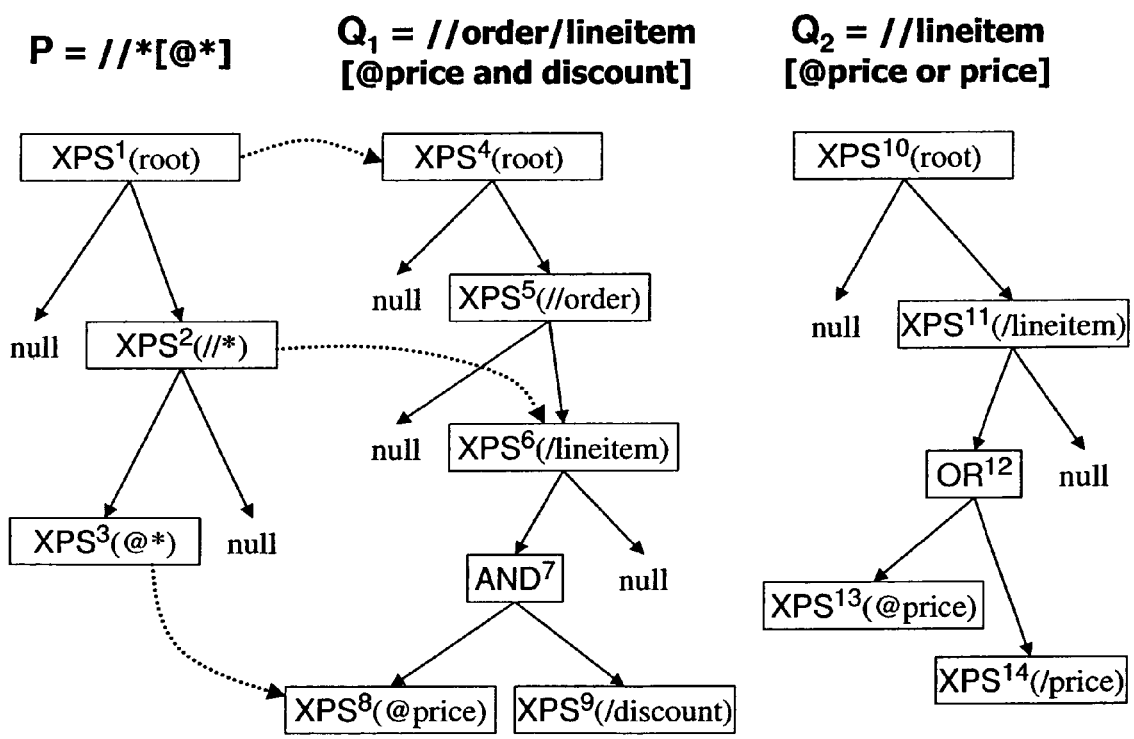
FIG. 3 is a diagram of an example PXR definition, including contained and not contained query trees, according to a preferred embodiment of the invention.

Rule 1.1 handles the situation where the query can be more restrictive than the PXR definition. It is sufficient for one of the conjuncts of Q to be mapped by a node of P. For example, the PXR P=//*[@*], which contains all XML nodes which have an attribute, can be used to answer Q1=//order/lineitem[@price and discount] as shown in FIG. 3. Dotted lines denote the mapping.

Figure 5:
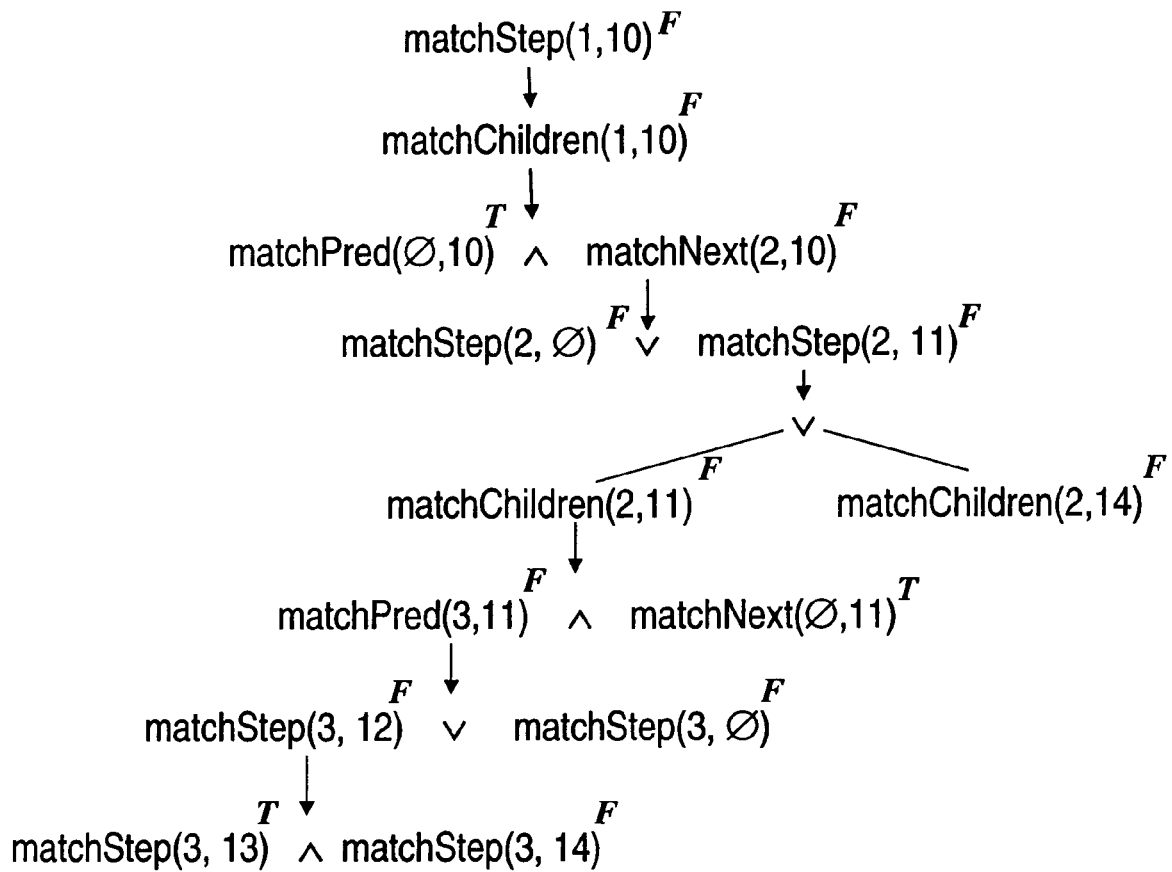
FIG. 5 is a diagram of the execution of the matching algorithm for P and $Q_2$ of FIG. 3, according to a preferred embodiment of the invention.

Rule 1.2 says that if one disjunct of Q is mapped by a node p∈P, then p also has to map to some node in the other disjunct of Q. For example, the same P of FIG. 3 cannot be used to answer the query Q2=//order/lineitem[@price or price], which asks for lineitem nodes, which have either a price attribute or a price element. FIG. 5 shows the execution of the algorithm as the rules fire, and return false. There is no containment because there is no XPS node in the PXR that maps to XPS14. That is, the PXR does not contain lineitem elements with a price sub-element, but no attribute.

When the PXR node contains a "descendant" axis, the invention needs to keep looking for matches down in the tree, even if the current query node matches (rules 1.3). For example, in FIG. 3, the invention will try to map XPS2 to XPS5, XPS6, and XPS8. For all other axes types, the PXR node matches the query node only if they both have the same axis type. In that case, the invention needs to match the predicate and next steps of the PXR node (rule 1.4). The algorithm terminates when there is no match (rule 1.5).

When matching children, if the tests match, then the invention tries to match the predicate and the next step of p (rule 2.1). If p does not have a predicate then the step matches (rule 3.1). Recall that the query can be more restrictive than the PXR definition, but not the other way around. Hence, if p has a predicate and q does not, then the match fails (rule 3.2). The next steps are matched in the same fashion.

Conjunctive trees require the mapping to be total. The rule 3.3 states that if there is a conjunction in P, then both conjuncts have to map to some node in Q. However, it is sufficient for one disjunct in P to participate in the mapping (rule 3.4). For example, the PXR P=//order[@price or lineitem/@price] can be used to answer the Q1 of FIG. 3.

Handling Comparison Predicates

The containment algorithm is now extended to handle comparison predicates.

Before the matching takes place, the invention traverses both view and query trees and moves all predicate conditions into a list of filter expressions of the form: E1 o E2, where E1 is an XPS node, o is one of <, <=,>=,>,=,≠, and E2 is either an XPS node or a constant. If E2 is a constant, the filter is simple. In a pre-processing step, all the predicates in the query and view expression trees are extracted into a list, and the query and view trees are modified as follows. If the predicate is of the form "E1 o C1", where C1 is a constant and E1 is an XPS subtree, the predicate in the expression tree is replaced by the XPS subtree of E1. If the predicate is of the form "E1 o E2", where both E1 and E2 are XPS subtrees, then the operator "o" in the predicate is replaced by a conjunction "AND".

Predicate conditions complicate the containment algorithm, but value indexes are useless without predicates. For example, the PXR P=//order/lineitem[@price>60] contains the query Q=//order[lineitem/@price>100]. However their expression trees contain the> node on different levels (see FIG. 6), and cannot be easily matched. To solve this problem, the invention normalizes the expression trees by extracting the predicate conditions from the tree as a pre-process of the containment algorithm.

Figure 6:
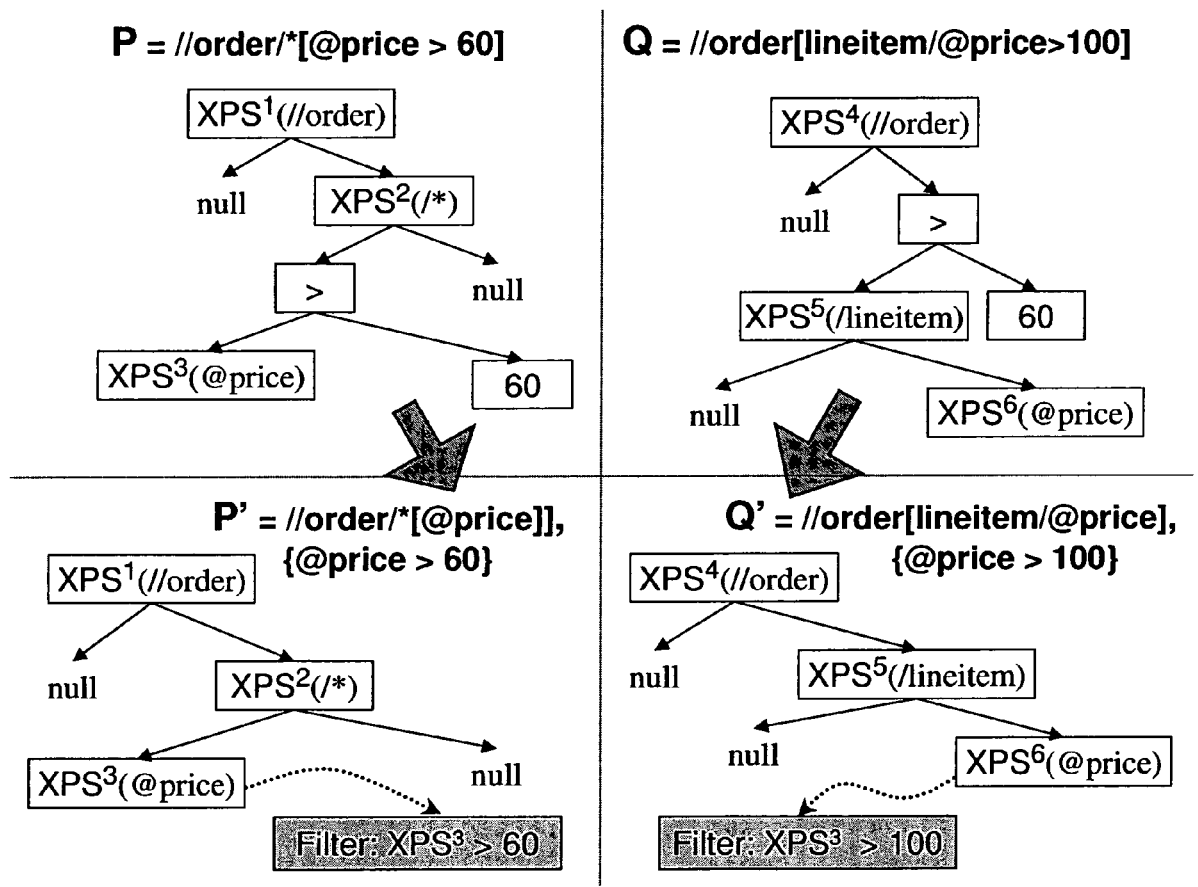
FIG. 6 is a diagram of normalizing the expression tree by extracting predicate conditions, according to a preferred embodiment of the invention.

For example, the invention creates the trees P' and Q' shown in the lower half of FIG. 6. These normalized trees are equivalent and can be easily matched by the algorithm, even though they are not exactly the same. Note that in P' the price attribute appears as a predicate of lineitem, whereas in Q' it is a next step.

The matching methodology computes the structural mapping from the view tree nodes to the query nodes. Then, for each extracted filter in the view, a corresponding filter in the query is identified. If there is no such filter, then there is no containment. If the view filter is of the form "E1 o C1", where C1 is a constant, and E1 is an XPS node, there needs to be a query tree node E2, such that E1 maps to E2 in the structural mapping. There is no containment if no such E2 exists, or there is no query filter of the form "E2 o C2". If such a query filter exists, then the invention checks if E1 o C1 subsumes E2 o C2. In this case, the subsumption check is done on the fly as the structural mappings are computed. If the view filter is in any other form, then the methodology first computes all the structural mappings.

Both the PXR expression tree as well as the query tree are normalized. The invention traverses both trees and moves all comparison predicates into a filter list. As the filters are extracted, the expression tree is rewritten according to the algorithm of FIG. 7. For example, /a[7>b/c[d=/e//f/g]] is rewritten into /a[b/c[d and /e//f/g]] and two filters c<7 and d=g.

Simple filters $f_n$, which contain a single XPS node n, are stored externally, but can be easily accessed given the o. While the containment algorithm builds a mapping of PXR nodes to query nodes, it also checks that for all simple filters $p_v$ connected to any node $p \in P$, there exists a filter $f_q$ connected to node $q \in Q$, such that p maps to q and $f_q \to f_p$.

Containment is now redefined by taking predicates into account.

Definition 7 (Full XPS Containment)

Let P, and Q be two XPS trees, and $F_p$ and $F_Q$ be the set of filters extracted from P and Q respectively. Q is contained in P, if there exists a mapping M as defined in Definition 6, and $\forall f_p = (p_1 \text{ op } p_2) \in F_p$, $\exists f_q \in F_Q$, such that $f_q \to \text{op } q_2$), and $q_j = p_i$ if $p_i$ is a constant, and $(p_i, q_i) \in M$, if $p_i$ is an XPS node.

EXAMPLE 4.1

The matching of P and Q of FIG. 6 proceeds as follows. First, extract the filters using the algorithm in FIG. 7, producing trees P' and Q'. Next, the containment algorithm of FIG. 7 computes the mapping M={(XPS1, XPS4), (XPS2, XPS5), (XPS3, XPS6)}. While matching the @price PXR node (XPS3), to the @price query node (XPS6), the algorithm notices that there exists an associated PXR filter XPS3>60 and looks for filters associated with the XPS6 node. It finds the filter XPS6>100, which is more restrictive than the PXR filter. As a result, it adds the mapping (XPS3, XPS6) into M.

Matching Complex Filters

To match a complex PXR filter (i.e., expression of form $p_1$ op $p_2$, where both $p_1$ and $p_2$ are XPS nodes) the invention needs to map both nodes before doing the match. Node-pairs $(p_1, q_1)$ and $(p_2, q_2)$ are built, where $p_1$ and $p_2$ are PXR nodes, and $q_1$ and $q_2$ are query nodes. If the PXR filter is not implied by any query filter involving $q_1$ and $q_2$, then $(p_1, q_1)$, $(p_2, q_2)$, and maybe node-pairs that depend on them, need to be removed from the mapping.

For example, consider P=//a[b≧c[d]] and Q=//a$_1$[b$_1$ and c$_1$[d$_1$]]/a$_2$[b$_2$=c$_2$[d$_2$/e0]]. (Query symbols are numbered to simplify presentation.) The pairs (a, a$_1$), (b, b$_1$), (c, c$_1$), and (d, d$_1$) will have to be removed since PXR filter b≧c does not have a match in the query. However, the mapping (a, a$_2$), (b, b$_2$), (c, c$_2$), and (d, d$_2$) is valid, since the query filter b$_2$=c$_2$ more restrictive than b≧c, and hence implies the PXR filter.

The containment algorithm may be extended to handle multiple mappings. For PXR matching, different mappings result in different compensations, thus all mappings should be computed to find the optimal compensation.

Simply storing a set of mappings can lead to an exponential blow-up, especially in case of recursive data. A solution to this problem is given below.

EXAMPLE 4.2

Figure 8:
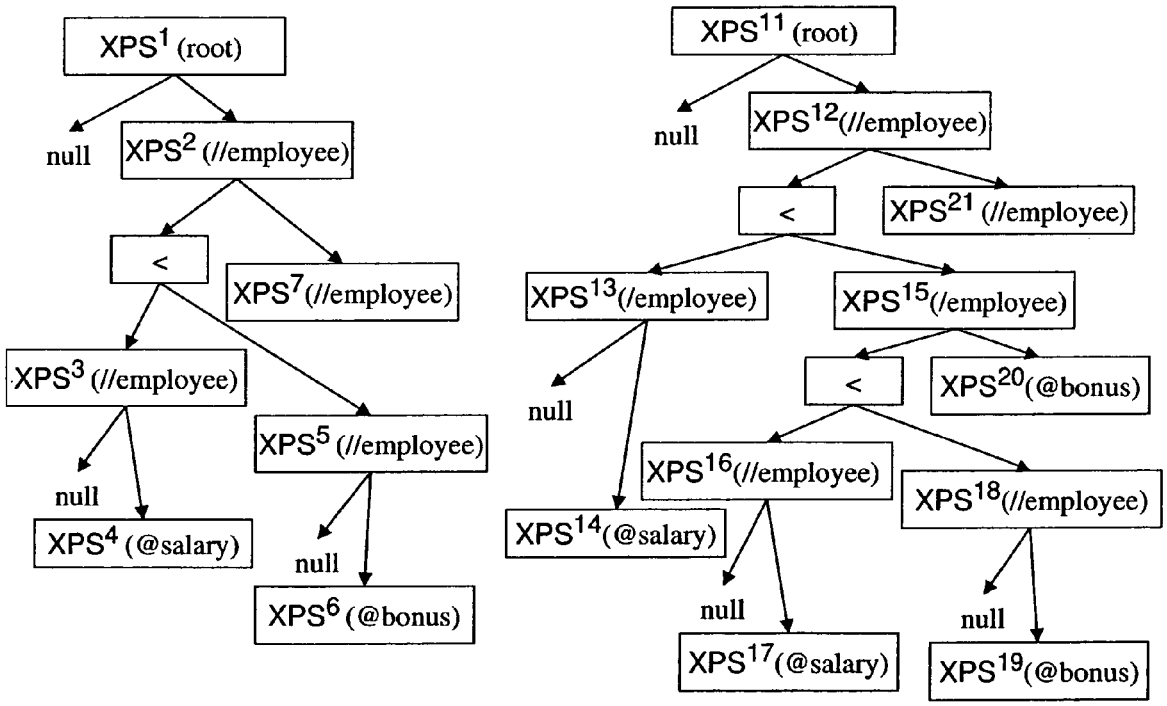
FIG. 8 is a diagram of a pruned mapping DAG for trees of Example 4.3, according to a preferred embodiment of the invention.

Consider a hierarchy of employees, where each employee element has salary and bonus attributes, and zero or more employee subelements. The following "cross-employee imbalance" view: P=//employee[.//employee/@salary<.//employee/@bonus]//employee contains all employees that work for managers who have underneath them two employees such that the salary of the first one is less than the bonus of the second one. The "cross-manager imbalance" query Q=//employee[employee/@salary<employee[employee/@salary<employee/@bonus]/@bonus]//employee asks for all employees that work for managers who have as their direct reports somebody whose salary is less than somebody else's bonus, and the employee with the oversized bonus, in turn, has two direct reports, such that the salary of the first one is less than the bonus of the second one. FIG. 8 shows XPS trees of the above P and Q. Q is contained in P and there are 22 valid mappings of P nodes to Q nodes. Indeed, XPS2 can match to either XPS12 or XPS15. In the first case, XPS3 can match to XPS13 or XPS16, XPS5 to XPS15 or XPS20, and XPS7 can map to one of 5 XPS nodes of Q, for a total of 20 combinations. In the second case there are only two possible mappings. In general, the number of mappings is exponential in the size of P tree, since the tree contains both branching and descendant navigations.

Next, a compact data structure called a mapping DAG is presented, that encodes a set of all mappings and is polynomial in the size of the expression trees. For example, it encodes all mappings for the above example with just 15 node-pairs. The structure also improves running time of the algorithm, by eliminating the steps that produce redundant node-pairs.

Definition 8 (Mapping DAG)

Mapping of a PXR tree P to a query tree Q is a directed acyclic graph (DAG), where each node is labeled with one of:

a node of the P XPS tree.

a node-pair (p, q).

The DAG has unique root which is labeled with the root of P. The same node-pair cannot appear in the DAG more than once. The DAG has the following edges:

DAG nodes labeled with the nodes of P have at most one parent.

A DAG node n labeled with XPS node p, has as children all possible (p, q) pairs, such that p maps to q given the parent node-pair, which is the lowest ancestor of n labeled with a node-pair.

A DAG node labeled with disjunction or conjunction node p of P, has as children all nodes labeled with children of p.

A DAG node labeled with a node-pair (p, q), has as children all nodes labeled with children of p.

Note that parent node-pair of an XPS node is always unique and sufficient to determine if p maps to q. It provides the "context" for the mappings that happen lower in the graph. The DAG avoids exponential explosion by storing mapping for each node separately instead of computing all the combinations.

An individual mapping is a set of node pairs in any connected sub-tree of the DAG that includes all nodes of P exactly once, and has only node-pairs as its leaves.

The mapping DAG is constructed as a side-effect of matchPred, matchStep, and matchChildren functions which produce nodes of the first, second and third type respectively. Construction of a mapping DAG is illustrated with the following example.

EXAMPLE 4.3

Consider again P and Q trees of FIG. 8. First, match the root, then call matchStep(XPS2, XPS 12), and XPS2 node becomes the root of the mapping DAG. Since XPS2 has "descendant" axis, the invention will attempt to map it to XPS12, . . . , XPS21. Only two calls to matchChildren( ) return true. Next, create 2 node-pairs (XPS2, XPS12) and (XPS2, XPS15) and add them as children of the XPS2 node.

First consider the (XPS2, XPS12) node-pair. Node $a_1$ has the predicate [XPS3 and XPS5] (recall, that filter extraction replaces ">" node with an "and") and the next child XPS7. Thus, the node-pair becomes the parent of two nodes: AND and XPS7. AND node in turn has two children XPS3 and XPS5. Since XPS2 was mapped to XPS12, node XPS3 can be mapped to XPS13 or XPS16. Thus, add (XPS3, XPS13) and (XPS3, XPS16) as children of XPS3. The rest of the branch is constructed is similar fashion. Now consider (XPS2, XPS15) node-pair. It has the same set of children as its sibling, however in this context XPS3 can only map to XPS 16. Thus the same nodepair (XPS3, XPS16) is added as a child of the new XPS3.

Figure 9:
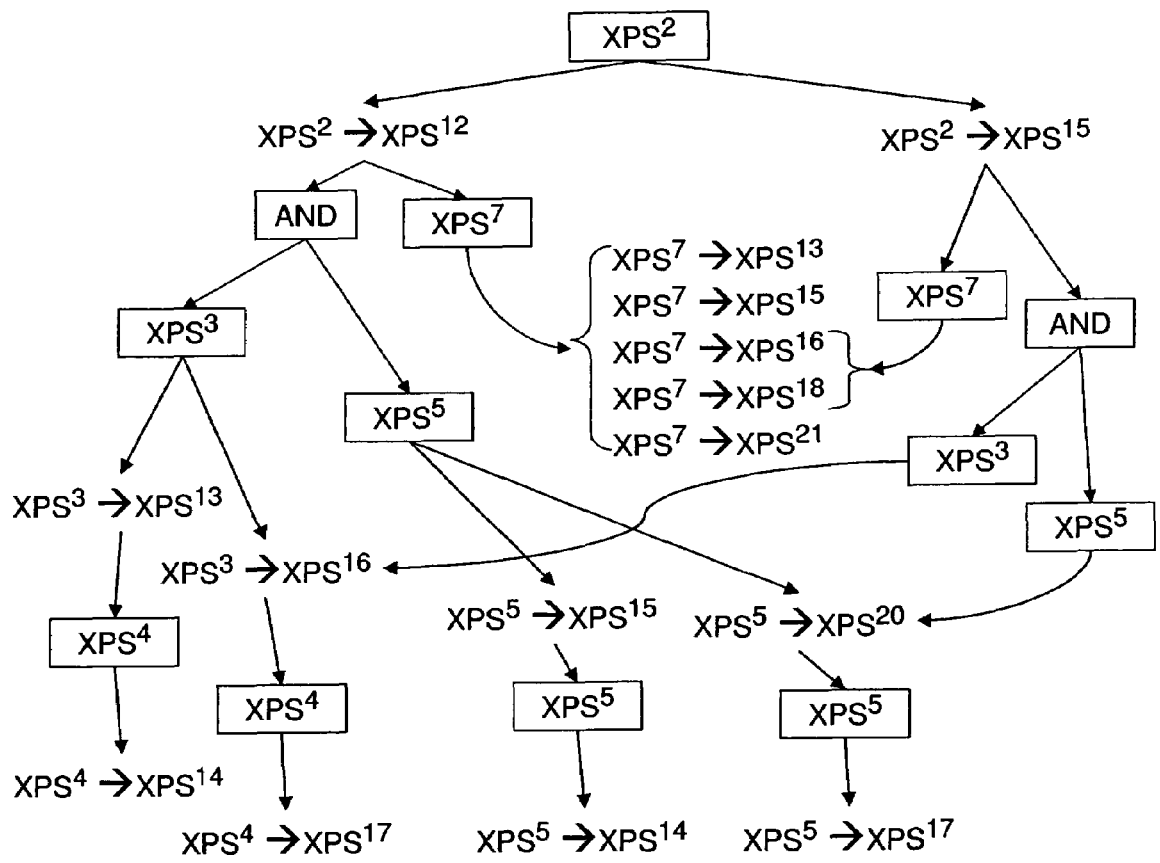
FIG. 9 is a diagram of a mapping DAG for trees of Example 4.3, according to a preferred embodiment of the invention.

Applying the same procedure recursively for all nodes, the result is the mapping structure of FIG. 9.

Once the mapping DAG is constructed, PXR filters should be considered, to eliminate invalid mappings. For every PXR filter $f_p = p_1$ op $p_2$, remove from the mapping DAG node labeled with pairs (p, q), where p is $p_p$ or $p_2$, such that q does not appear in any query filter $f_q$ that implies $f_p$.

Once the invalid node-pairs are removed, the mapping DAG is pruned with a single bottom-up traversal, following these rules:

DAG node labeled with XPS p, is removed if it doesn't have any children.
Conjunction node with less than two children is removed.
Disjunction node with no children is removed.
Node-pair without children is removed, unless its parent XPS node corresponds to a leaf XPS node in the PXR tree.
Matching the Datatypes The invention supports XML indexes that index only values of a particular datatype. The matching algorithm is able to exploit such "typed" indexes by locating an XPS node of the query XPS tree that matched the index extraction point. The algorithm uses type information available on said XPS node in form of schema information or explicit type cast. Alternatively, the algorithm is able to infer the type information from the filters associated with the said XPS node, based on the type of the constant in the filter. The type of the XPS node has to be the same as the index type, or it has to be a descendant of the index type in the type hierarchy of query language used (e.g. XQuery or SQL/XML).

A typed PXR $I^T$ is a pair<I, T>, where I is an XPS tree and T is the datatype of return element. The result of $I^T$ on a document D is a set of all witness trees of I(D), such that the datatype of the result element is either T or can be promoted to T according to the XQuery type hierarchy. In other words the typed PXR disqualifies the witness trees with result nodes of the wrong type.

By definition, given that $Q \subseteq^{WT} I$, the invention can guarantee that $Q \subseteq^{WT} I_T$ only if $\forall D$, $\forall W_Q \in Q(D)$; $\exists W_I \in I^T(D)$, such that $W_I$ is a subtree of $W_Q$. Such witness tree(s) exist in I(D), and the invention needs to prove that extracted node of one of these trees can be promoted to type T. This can be achieved by the matching algorithm, if one has some type information on node q of Q, which is matched by extraction point of I. For instance, if q has schema information, explicit type cast, or has a simple predicate of the form [q op const], where constant is of type T or its descendants in type hierarchy.

The above observation leads to the following algorithm:
1. Run un-typed matching algorithm that detects $Q \subseteq I$ by matching nodes of I to nodes of Q.
2. For each match, analyze node $q \in Q$ to which extraction point of I matches.
3. For each simple filter associated with q, find the type of the filter constant $T^F$.
4. If $T^F = T$ or $T^F$ can be promoted to T, then $Q \subseteq^{WT} I^T$.

Complexity of the Algorithm

First, consider space complexity of the algorithm. By definition of a mapping DAG, the same node-pair cannot occur in the DAG more than once. Also, a nodepair can have at most |P| descendants other than the node-pairs, where |P| is the number of nodes in the P XPS tree. Thus the size of the DAG is $O(|P|^2 * |Q|)$.

The cost of constructing the DAG is also polynomial. Note that all four functions and matchStep, matchChildren, matchP and matchNext are deterministic, and there are only |P|*|Q| distinct sets of parameters. The results of all function calls can be stored in a table, hence calling the same function with the same parameters at most once. In the worst case (rule 1.3) a function call may expand into |Q| function calls. Thus the algorithm runs in $O(|P|*|Q|^2)$ time.

The cost of pruning the DAG is a product of size of the DAG and number of filters extracted from V and Q, which is $O(|P|^3 * |Q|^2)$. Filter subsumption ($f_q \rightarrow f_p$) can presumably be checked in constant time, since only six comparison operators are allowed, and the invention doesn't consider negation.

The invention also handles "self" and "descendant-or-self" axes by using additional rules, which do not change complexity of the algorithm. XPS nodes with "parent" axis in the query increase the complexity of the matching process. To avoid this problem, the invention rewrites the query expression into an equivalent XPath expression that does not use "parent" using rewrite transformations similar to the ones proposed in [22]. The rules are not listed here in the interest of space. However, the rules require converting the Q into the DNF, which may be exponential in the number of disjunctions in the query. Thus, the algorithm is not polynomial if the Q contains both "parent" axis and disjunctions.

Matching Framework

The previous section defines containment between a PXR and a query, and finds mappings between the nodes of PXR and query expression trees. The invention now exploits these results in a framework for utilizing PXRs to answer expensive XPath queries. Frequently, a PXR cannot be used directly to answer a query and further computation, called compensation, is required. The invention first defines a taxonomy for classifying PXRs according to the type of information kept in the PXR, and then maps three classes of this taxonomy to structures that are commonly exploited in relational systems in optimizing expensive SQL queries. Finally, it describes the prototype that exploits SQL/XML views and partial XML indexes.

Taxonomy of Pre-Computed XPath Results

Next, define a taxonomy of structures for storing the results of XPath expressions. The structures that store pre-computed XPath results can be classified in a taxonomy that describes the representation of the results kept and any auxiliary information that is in the PXR to extend the set of queries that can use the PXR.

The invention classifies a PXR according to the following information:

Node Reference/Document Reference/Copy

Either references or actual values can be stored as the result of XPath expressions. The reference may point to document nodes, or to individual nodes that satisfy the XPath expression. When the XML documents are arbitrarily large and structurally complex, it is beneficial to keep node references. The invention can traverse the documents in both forward and reverse direction to compensate the PXRs. When there is a large number (millions) of small documents and the XPath expressions are selective, the invention can store document references. In this case, there is no need to compute a complicated compensating expression, as the invention can simply reapply the original query. Sometimes it is necessary to maintain value based semantics, in which case the parent is lost and the invention can only navigate along the forward axes.

Typed Value

Storing typed values facilitates compensating value based comparison predicates. B+-tree indexes on typed values further expedites the processing of XPath expressions. Notice that when the typed values are kept, the PXR can be used to answer predicates on XML nodes, even though the defining XPath expression of the PXR does not contain any predicates. If a PXR contains the results of /lineitem/@price, it can be used to answer the XPath expression /lineitem [@price >1000], by applying a selection on the typed value of price attribute nodes.

Full Linear Paths to Nodes

Full paths are linear XPath expressions which do not contain any predicates or branching. Such paths can be computed while parsing the XML document to execute the XPath expression. These linear paths can be very useful in answering the query especially when the defining XPath expression of the PXR contains descendant axes and/or wildcard name tests. For example, if the PXR contains the results of //@*, it can be used to answer the queries /a/@b, /a/b/@c, //a/@b, and etc.

The above dimensions can be combined to create 12 different classes of PXRs with varying capabilities and performance. The capabilities of these structures are examined below. FIG. 10 gives an example instantiation of a PXR. Common classes of those PXRs are discussed in some detail, namely materialized views and XML indexes.

Materialized XML Views

One class of PXRs, which only store copies of XPath results, maps to materialized SQL/XML views. As SQL/XML query functions extract their result and create a new value, this new XML instance is what gets materialized.

Another class of PXRs, which only contain node references, maps to materialized XQuery views. Although views are not defined for XQuery, one can extrapolate that what gets materialized is an instance of the XQuery data model [31], which contains node references. Materialized XQuery views may also be defined with the value based semantics. Extracting and materializing values has several implications that will become clearer when computing compensation is discussed.

Only value based semantics are considered for materialized XML views. Exploiting such views is described below.

XML Indexes

Another instance of PXRs is the one which stores document or node references, full paths to nodes, and typed values, roughly corresponding to partial XML indexes that are defined in terms of path expressions. This type of PXR is considered as XML indexes because they can be exploited to answer XPath expressions containing comparison predicates. If the document references are stored, then this index is referred to as the document index, and if node references are stored, then this index is called the node index.

There have been numerous proposals [19, 8, 17, 15, 24, 23] for XML indexing. Most of these proposals are capable of answering a single linear path expression. If the query contains branching, then the results of each linear branch needs to be intersected at the branching point which is the lowest common ancestor. This requires efficient techniques to detect a common ancestor and compute a join at that point. Several schemes can be used to detect ancestors very efficiently. The PXRs are assumed to also contain the necessary information to handle such joins and, the index interface is assumed to be capable of processing branching path expressions. Use of such index structures is shown below.

Computing Compensation

Containment is a necessary but not a sufficient condition for utilizing PXRs. When a PXR does not contain the exact results of the query, the invention must to compensate the results of the PXR. This extra computation depends on what information is stored in the PXR. A PXR P is usable for a query Q, if there exists another query $Q_C$, called compensation, such that $Q=Q_C$ (P). That is, the invention can execute further expressions on the results of the PXR to compute the query results. To identify what portion of the query needs to be compensated, the invention first needs to distinguish between exact and subsumption matches.

Definition 9

A filter $f_q$ of a query Q matches exactly if there exists a filter $f_p$ in the PXR P such that $f_p \equiv f_q$ (i.e. $f_q \rightarrow f_p$ and $f_p \rightarrow f_q$) and $f_p$ is not in the subtree of a disjunction (or) node.

Definition 10

Suppose P is a PXR definition, and Q is a query. Let M be the mapping, computed by the containment algorithm of Section 4, and $F_p$ and $F_Q$ be the list of filters extracted from P and Q, respectively. P and Q match exactly, denoted by P≡Q, if the following conditions hold:
1. For all XPS nodes $q \in Q, \exists p \in P$ such that $(p, q) \in M$.
2. There is no mapping (p, q) in M such that $q_{axis} \neq P_{axis}$ or $q_{test} \neq P_{test}$.
3. All $f_q$ in $F_q$ match exactly.

If any one of the above three conditions is not satisfied, then P subsumes Q, and is denoted by P⊆Q.

If P matches Q exactly, the PXR can be used directly and does not require any other compensating operations. However, if the match is not exact, then the invention must determine the portion of the query that can be answered using the PXR, and the compensating expression to complete the query from the results.

To calculate the compensating expression, the invention distinguishes a node in the query as the query extraction point (QEP) which is the node returned or extracted by the PXR. There are three cases which need compensation:

Extra Navigation

The subtree rooted at the QEP needs to be compensated. These nodes correspond to extra navigation that needs to be applied to the contents of the PXR.

Predicates

There are predicate nodes in the query tree which do not match exactly. In this case, these predicates need to be applied to the contents of the PXR. Note that if there are predicates above the QEP, the XML document should be traversed in the reverse direction.

Name/Ancestors

There is a pair (p, q) in M such that $p_{axis}$="descendant(-or-self)" and $q_{axis}$="child", or $p_{test}$="*" and $q_{test}\neq$"*". In the former case, the parent of q needs to be verified. For example, if the PXR contains the results of //b and the query asks for /a/b, then the invention needs to restrict the result to only those b elements whose parent is an a element. In the latter case, the invention needs to verify the element names. For example, if the PXR contains /a/*, and the query asks for /a/b, then it needs to verify that only b nodes are returned.

Identifying the compensating expression and the portion of the query that the PXR can answer depends on what is actually stored in the PXR. For example, if the PXR stores the full paths to nodes, then the invention does not need to compensate for the last case because it can verify the parent and the name of a node directly using the stored paths. If it can execute the compensation as a restriction on the PXR, then this type of compensation is called pushdown compensation. When the invention needs to apply predicates or extra navigation, and the XML instance needs to be traversed, this type of compensation is called residual compensation. FIG. 11 shows which cases can be executed as pushdown and which ones need to be compensated as residuals for the taxonomy of PXRs.

Next the discussion concentrates on three of these possible PXRs, and describes how to use this framework to exploit XML indexes and SQL/XML views.

XML Views for SQL/XML

To handle view matching for SQL/XML queries, SQL view matching algorithms [13, 32] need to be extended to consider XPath expressions. An extension of the view matching infrastructure of IBM's DB2™ UDB has been prototyped to identify usable views containing XPath expressions. The implementation employs the Xalan [2] XPath processor, wrapped as a user defined function, to execute the XMLExtract and XMLContains SQL/XML functions.

The expression and function matching routines of the current view routing infrastructure of DB2™ are extended. Whenever one of the functions of SQL/XML is present, the invention uses the containment algorithm presented above, to decide containment between XPath expressions. Depending on where the XPath expression appears in the SQL/XML query, it needs to check different conditions. If the query contains an XMLContains call, then it checks if the materialized view also contains an XMLContains call, whose first argument is the same, and their XPath expressions match exactly. Equivalent XPath expressions are needed in this case, because XMLContains is a boolean function and returns either true or false, and hence there are no means to execute the compensation if the match is not exact.

On the other hand, if the query contains an XMLExtract call, the invention can execute a compensation under certain conditions. In the case of SQL/XML only XML values are stored; no full path or typed value is stored, hence the parent is lost and the invention cannot compensate any predicates or verify any parent or node test above QEP (entry 3 in FIG. 11). In this case, the invention checks if all path expression nodes of the view above QEP match exactly. For example, if V=/a[b[@c>0]/d[e] and Q=/a[b[@c>0]/d[e>0]/f, then it can use V. Also note that two XPath expressions can match exactly, even if they are not syntactically the same. For example, V=/a[b[@c=1]/b[@e=2], Q=/a/b[@c=1 and @e=2].

In the case of materialized SQL/XML views, the invention can compensate the predicates at the extraction point, and reapply all the navigation and predicates below the extraction point. For example, if V=/a/b[@c>0] and Q=/a/b[@c>10]/d[e>0]/f, then $Q_C$=.[@c>10]/d[e>0]/f.

If containment is detected, the invention computes the compensating expression when the match is not exact. In the case of materialized SQL/XML views, computing compensation is straightforward and includes the extra navigation and predicates that need to be applied: It includes the rest of the path expression after the extraction point. The following example illustrates how SQL/XML views can be used to rewrite a user query.

EXAMPLE 5.1

Let MV1=select xmlextract(xmlcol, '/a[b/@c>40]/d[e]') from t; Q=select xmlextract(xmlcol, '/a[b/@c>40]/d[e]/f[@g=10]') from t; In this case, the XMLExtract function is on the same column, and the XPath expression /a[b/@c>40]/d[e] subsumes the XPath expression in the query. The compensation expression is /*/f[@g=10]. In the compensation, the wild card test is needed because the XMLExtract call extracts and materializes the d nodes, and hence d is the top-most element node. The rewritten query, which uses MV1 is: Q'=select xmlextract(mv.xmlcol, '/*/f[@g=10]') from MV1.

Index Matching

Document indexes correspond to entry 11 in FIG. 11. In this case, because the invention does not have access to individual nodes (it knows only the root of the document), it needs to reapply the original query to the results of the index, that is $Q_C$ 32 Q. Although the original query needs to be reapplied, the index still filters out all the documents that do not satisfy the given XPath expression. This type of index is very beneficial in a scenario where there are large numbers of small documents.

Node indexes correspond to entry 12 in FIG. 11. In this case, the index is capable of processing comparison predicates, and verifying ancestors and node tests as part of the index pushdown. The index also handles conjunction, disjunction, and branching in general by maintaining extra information to compute the joins at the branching points.

A specialized algorithm that computes the index pushdown is discussed next, then we discuss how to build a compensating expression which is applied to the index result.

Computing Index Pushdown

The invention needs to take into consideration the capability of the index to apply comparison predicates, and verify full paths to nodes when computing the index pushdown. Taking these factors into account, a two-phase algorithm is employed.

In the first phase of the algorithm, the invention traverses Q bottom up, and assigns one of the following codes to the each node:

In—the subtree rooted at this node contains only mapped XPS nodes; it will be preserved.

Out—the subtree rooted at this node contains unmapped XPS nodes; it will be removed.

None—the subtree rooted at this node does not contain any XPS nodes.

The code assignment proceeds bottom up as follows: Constant and null predicate nodes are marked as None. XPS nodes which appear in M are marked In. XPS nodes which do not have any children, and are not in M are marked as Out. The rest of the nodes are annotated based on the codes of their children nodes according to the following rules:

An XPS node is marked In if one of its children is marked In, and marked Out otherwise.

A conjunction (and) or a comparison predicate node is marked In if one of its children is marked In, and marked None if both of its children are marked None, and marked Out otherwise.

A disjunction (or) node is marked In if both of its children are marked In, and marked Out otherwise.

The second phase of the algorithm uses the annotations produced by the first phase to produce $Q_I$. It initializes $Q_I=Q$. Then, it traverses $Q_I$ top-down and applies the following rules to each node q:
1. If q is marked Out remove it from $Q_I$.
2. If q is marked In and it is a conjunction or a comparison predicate node, and one of its children $q_1$ is marked In, while the other one is marked Out, replace q with $q_1$.

Building Index Compensation

When the index does not return the exact answer to the query, the invention also needs to compute a compensation expression $Q_C$ to obtain the query result, that is it needs to build $Q_C$ such that $Q=Q_C(Q_I(I))$.

In the case of node index, the invention stores references to nodes that satisfy the XPath expression. Hence, it can traverse the XML data to apply the compensating expression.

We need to compensate all predicates of the original query except those that were matched exactly, and apply additional navigation if there are unmatched navigation nodes in the query. As the index contains full paths to nodes, there is no need to verify the parent if the matched view node has an "descendant" or "descendant-or-self" axis, nor verify the node test if the view node has a wild card. The query extraction point (QEP) is identified as the node returned by the index. Suppose QEP is at level i in the query expression tree. The invention traverses the query tree top-down, producing the compensation $Q_C$. If a predicate $q_{pred}$ is encountered at level j<i which is not in $Q_I$, then add a chain of predicates [$axis_{i-1}$::$test_{i-1}$[ ... [$axis_j$:$test_j$[$q_{pred}$] ... ] of length i-j, where $axis_k$="parent" if the axis of node $q_k$ is "child" or "attribute", $axis_k$="ancestor" if axis of $q_k$ is "descendant" and $axis_k$="ancestor-or-self" if the axis of qk is descendant-or-self", and $test_{k=test\ (qk)}$. If there predicates at the QEP which have not been applied by the index, add those predicates as well. Every step below the QEP has to be reapplied. For example, for I=/a/*/c, and Q=/a[b>0]/d/c/e, $Q_I$=/a/d/c, and $Q_C$=.[parent::d[parent::a[b>0]][ ... ==/]/e.

If there are multiple indexes that apply, compute an XPath expression which is the union of all indexes (i.e. I=$I_1$ OR $I_2$ OR ... OR $I_n$) and call the containment algorithm for I. As the containment algorithm builds a mapping DAG that contains all possible mappings, it finds all indexes that can be used to answer the user query. The invention can then compute the intersection of all these indexes, and the resulting auxiliary table can answer the index pushdown.

Figure 12:
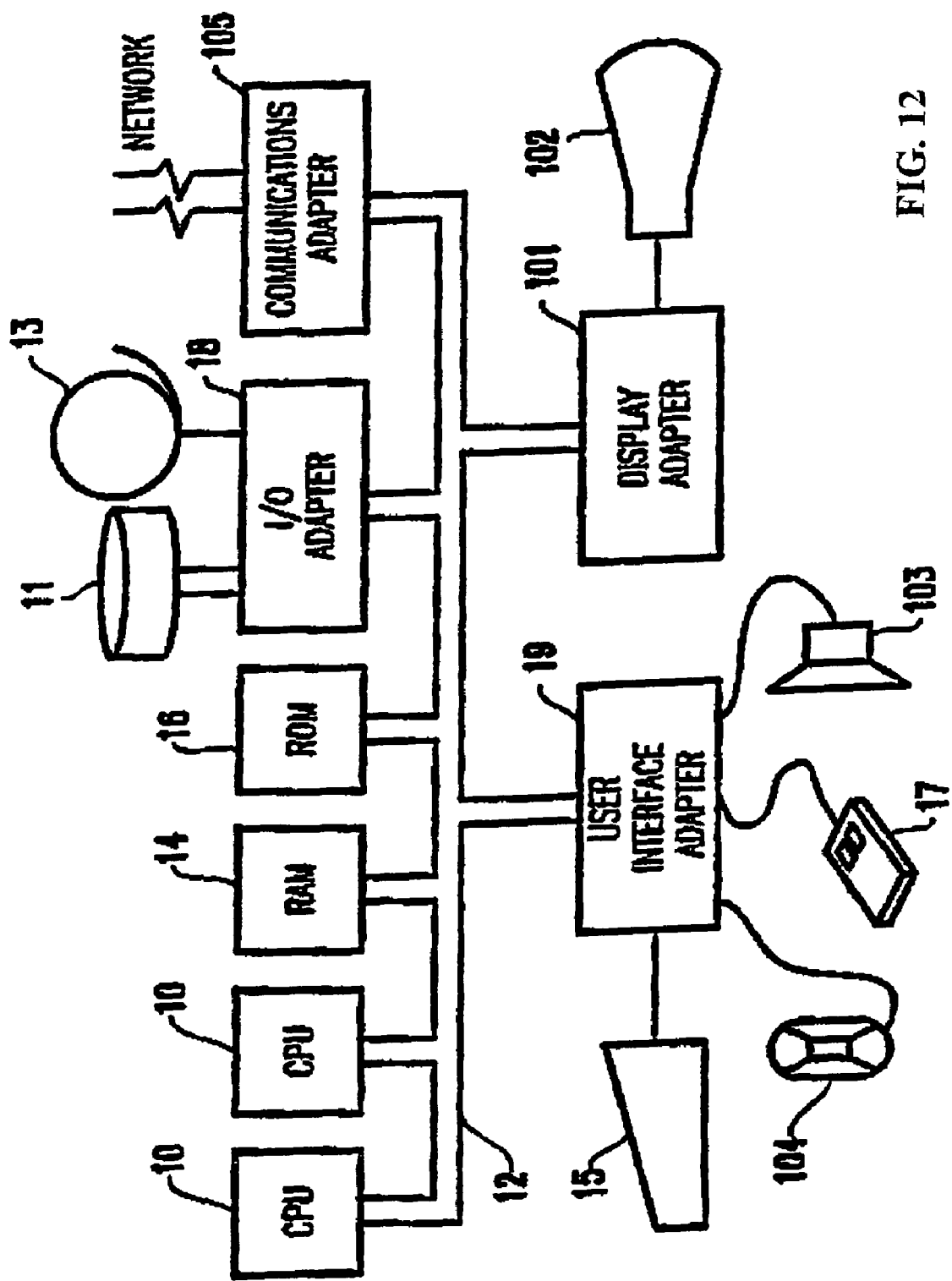
FIG. 12 is a diagram illustrating a hardware embodiment of the invention.

A representative hardware environment for practicing the present invention is depicted in FIG. 12, which illustrates a typical hardware configuration of an information handling computer system in accordance with the subject invention, having at least one processor or central processing unit (CPU) 10. CPUs 10 are interconnected via system bus 12 to random access memory (RAM) 14, read-only memory (ROM) 16, an input/output (I/O) adapter 18 for connecting peripheral devices, such as disk units 11 and tape drives 13, to bus 12, user interface adapter 19 for connecting keyboard 15, mouse 17, speaker 103, microphone 104, and/or other user interface devices such as touch screen device (not shown) to bus 12, communication adapter 105 for connecting the information handling system to a data processing network, and display adapter 101 for connecting bus 12 to display device 102. A program storage device, readable for example by the disk or tape units, is used to load the instructions which operate the invention from a computer-readable medium onto the computer system.

The present invention and the various features and advantageous details thereof are explained with reference to the non-limiting embodiments illustrated in the accompanying drawings and detailed in the description above. Descriptions of well-known components and processing techniques are omitted so as not to unnecessarily obscure the present invention in detail. Specific embodiments of the invention have been described by non-limiting examples which serve to illustrate in some detail various features of significance. The examples are intended merely to facilitate an understanding of ways in which the invention may be practiced and to further enable those of skill in the art to practice the invention. Accordingly, the examples should not be construed as limiting the scope of the invention. While the invention has been described in terms of preferred embodiments, those skilled in the art will recognize that the invention can be practiced with modification within the spirit and scope of the appended claims.

REFERENCES

[1] S. Amer-Yahia, S. Cho, L. V. Lakshmanan, and D. Srivastava. Minimization of tree pattern queries. In Proceedings of SIGMOD, pages 497-508, Santa Barbara, Calif., 2001.

[2] Xalan C++ an XSLT processor. The Apache XML Project, http://xml.apache.org/xalan-c/index.html.

[3] P. Buneman, W. Fan, and S. Weinstein. Interaction between path and type constraints. In Proceedings of PODS, pages 56-67, Philadelphia, Pa., 1999.

[4] D. Calvanese, G. DeGiacomo, M. Lenzerini, and M. Y. Vardi. Rewriting of regular expressions and regular path queries. In Proceedings of PODS, pages 194-204, 1999.

[5] D. Calvanese, G. DeGiacomo, M. Lenzerini, and M. Y. Vardi. Answering regular path queries using views. In Proceedings of ICDE, pages 389-398, 2000.

[6] S. Chaudhuri, R. Krishnamurthy, S. Potamianos, and K. Shim. Optimizing queries with materialized views. In Proceedings of ICDE, pages 190-200, 1995.

[7] S. Cohen, W. Nutt, and A. Serebrenik. Rewriting aggregate queries using views. In Proceedings of PODS, pages 155-166, 1999.

[8] B. F. Cooper, N. Sample, M. J. Franklin, G. R. Hjaltason, and M. Shadmon. A fast index for semistructured data. In Proceedings of VLDB, pages 341-350, Roma, Italy, 2001.

[9] A. Deutsch and V. Tannen. Containment and integrity constraints for XPath. In Proceedings of KRDB, 2001.

[10] A. Eisenberg and J. Melton. SQL/XML and the SQLX Informal Group of Companies. Sigmod Record, 30(3): 105-108, 2001.

[11] M. Fernandez and D. Suciu. Optimizing regular path expressions using graph schemas. In Proceedings of ICDE, pages 14-23, 1998.

[12] R. Goldman and J. Widom. Dataguides:enabling query formulation and optimization in semistructured databases. In Proceedings of VLDB, pages 436-445, 1997.

[13] J. Goldstein and P. Larson. Optimizing queries using materialized views: A practical, scalable solution. In Proceedings of SIGMOD, Santa Barbara, Calif., 2001.

[14] G. Grahne and A. Thomo. Algebraic rewritings for optimizing regular path queries. In Proceedings of the 8th International Conference on Database Theory (ICDT), pages 301-315, London, UK, January 2001.

[15] R. Kaushik, P. Bohannon, J. F. Naughton, and H. F. Korth. Covering indexes for branching path queries. In Proceedings of SIGMOD, 2002.

[16] A. Y. Levy, A. O. Mendelzon, Y. Sagiv, and D. Srivastava. Answering queries using views. In Proceedings of PODS, pages 95-104, 1995.

[17] Quanzhong Li and Bongki Moon. Indexing and querying xml data for regular path expressions. In Proceedings of the 27th International Conference on Very Large Databases (VLDB), pages 361-370, Roma, Italy, September 2001.

[18] G. Miklau and D. Suciu. Containment and equivalence for an XPath fragment. In Proceedings of PODS, pages 65-76, 2002.

[19] T. Milo and D. Suciu. Index structures for path expressions. In Proceedings of ICDT, pages 277-295, Jerusalem, Israel, January 1999.

[20] S. Nestorov, J. D. Ullman, J. L. Wiener, and S. S. Chawathe. Representative objects: Concise representations of semistructured, hierarchial data. In Proceedings of ICDE, pages 79-90, 1997.

[21] F. Neven and T. Schwentick. XPath containment in the presence of disjunction, dtds and variables. In Proceedings of ICDT, 2003.

[22] D. Olteanu, H. Meuss, T. Furche, and F. Bry. XPath: Looking forward. In Workshop on XML-Based Data Management, 2002.

[23] omitted.

[24] F. Rizzolo and A. O. Mendelzon. Indexing xml data with toxi. In Proceedings of WebDB, pages 49-54, 2001.

[25] ISO/IEC JTC 1/SC 32/WG3, ISO-ANSI Working Draft: XML-Related Specifications (SQL/XML).

[26] SQL/XML. http://www.sqlx.org.

[27] D. Srivastava, S. Dar, H. V. Jagadish, and A. Y. Levy. Answering queries with aggregation using views. In Proceedings of VLDB, pages 318-329, 1996.

[28] XML Schema, Parts 0,1 and 2, February 2002. W3C Recommendation, http://www.w3.org/XML/Schema.

[29] XML Path Language (XPath) Version 2.0, December 2001, W3C Working Draft, http://www.w3.org/TR/xpath20.

[30] XQuery 1.0: An XML Query Language, December 2001, W3C Working Draft, http://www.w3.org/TR/xquery.

[31] XQuery 1.0 and XPath 2.0 Data Model, December 2001, W3C Working Draft, http://www.w3.org/TR/query-datamodel.

[32] M. Zaharioudakis, R. Cochrane, G. Lapis, H. Pirahesh, and M. Urata. Answering complex SQL queries using automatic summary tables. In Proceedings of SIGMOD, pages 105-116, 2000.

We claim:

1. A computer-implemented method for querying a structured document, comprising:
    identifying auxiliary structures including pre-computed information applicable to accelerate user query processing by detecting containment mappings between query expressions and expressions in the auxiliary structures,
    wherein the auxiliary structures include a number of indexes, a number of partial XML indexes, and a number of materialized views;
    computing compensation to perform index selection and materialized view matching to determine what portion of said query expressions are evaluated by said index and said materialized view;
    finding the user query result by executing a rewritten query that exploits the pre-computed information to each detected containment mapping; and
    reporting said user query result to said user,
    wherein executing the rewritten query further comprises:
    constructing a pushdown expression for to perform evaluation with information in the auxiliary structure; and
    constructing a compensation expression for to perform evaluation as a residual query, wherein said residual query comprises at least a portion of said query not associated with said index or said materialized view.

2. The method of claim 1 further comprising implementing the method in a relational database management system.

3. The method of claim 1 wherein the structured document includes a set of nodes described by an expression tree.

4. The method of claim 1 wherein the structured document is an XML document.

5. The method of claim 1 wherein the pre-computed information includes precomputed XPath results (PXRs).

6. The method of claim 1 wherein the user query processing further comprises navigating path expressions with a query language.

7. The method of claim 6 wherein the query language employs XPath.

8. The method of claim 6 wherein the query language includes at least one of:
    XQuery, SQL/XML, and XSLT.

9. The method of claim 1 wherein the detecting further comprises:
    selectively executing a set of predetermined sequential rules to perform traversing of a tree of nodes; matching node data with the pre-computed information; and
    selecting auxiliary structures that subsume portions of the user query.

10. The method of claim 1 wherein the compensation expression is an XPath predicate.

11. The method of claim 1 further comprising building a taxonomy of auxiliary structures.

12. The method of claim 11 further comprising classifying compensation expressions to the taxonomy according to a predetermined set of values.

13. The method of claim 1 wherein the identifying handles at least one of: nested path expressions, nested predicates, value-based comparison predicates, conjunction, disjunction, all XPath axes, branches, and wild cards.

14. The method of claim 13 wherein the XPath axes include child, descendant, self, attribute, parent, and descendant-or-self.

15. The method of claim 1 further comprising creating a mapping directed acyclic graph (DAG) that separately encodes a set of all containment mappings for each node.

16. The method of claim 15 further comprising pruning the mapping DAG to remove invalid node pairs.

17. A computer-implemented method for querying a structured document, comprising:
    identifying auxiliary structures including pre-computed information applicable to accelerate user query processing by detecting containment mappings between query expressions and expressions in the auxiliary structures, wherein the auxiliary structures include a number of indexes, a number of partial XML indexes, and a number of materialized views;

computing compensation to perform index selection and materialized view matching to determine what portion of said query expressions are evaluated by said index and said materialized view;

finding the user query result by executing a rewritten query that exploits the pre-computed information to each detected containment mapping; and reporting said user query result to said user;

wherein the detecting further comprises:

selectively executing a set of predetermined sequential rules to perform traversing of a tree of nodes; matching node data with the pre-computed information; and selecting auxiliary structures that subsume portions of the user query, wherein the node data includes axis data, test data, predicate data, and next step node data.

18. A computer-implemented method for guening a structured document, comprising:

identifying auxiliary structures including pre-computed information applicable to accelerate user query processing by detecting containment mappings between query expressions and expressions in the auxiliary structures, wherein the auxiliary structures include a number of indexes, a number of partial XML indexes, and a number of materialized views;

computing compensation to perform index selection and materialized view matching to determine what portion of said query expressions are evaluated by said index and said materialized view;

finding the user query result by executing a rewritten query that exploits the pre-computed information to each detected containment mapping;

reporting said user query result to said user; and normalizing expression trees by moving predicate conditions into filter expressions before the identifying, wherein the detecting further comprises:

selectively executing a set of predetermined sequential rules to perform traversing of a tree of nodes; matching node data with the pre-computed information; and selecting auxiliary structures that subsume portions of the user query.

19. A computer-implemented method for querying a structured document, comprising:

identifying auxiliary structures including pre-computed information applicable to accelerate user query processing by detecting containment mappings between query expressions and expressions in the auxiliary structures, wherein the auxiliary structures include a number of indexes, a number of partial XML indexes, and a number of materialized views;

computing compensation to perform index selection and materialized view matching to determine what portion of said query expressions are evaluated by said index and said materialized view;

finding the user query result by executing a rewritten query that exploits the pre-computed information to each detected containment mapping; and reporting said user query result to said user;

further comprising creating a mapping directed acyclic graph (DAG) that separately encodes a set of all containment mappings for each node, wherein creating the mapping DAG is polynomial in terms of a size of expression trees.

20. A computer-based system for querying a structured document, comprising:

an identifier of auxiliary structures including pre-computed information applicable to accelerate user query processing by detecting containment mappings between query expressions and expressions in the auxiliary structures, wherein the auxiliary structures include a number of indexes, a number of partial XML indexes, and a number of materialized views;

a computer that computes computing compensation to perform index selection and materialized view matching to determine what portion of said query expressions are evaluated by said index and said materialized view; and a query evaluator that finds the user query result by executing a rewritten query that exploits the pre-computed information to each detected containment mapping, wherein said query evaluator reports said user query result to said user, wherein executing the rewritten query further comprises:

constructing a pushdown expression for to perform evaluation with information in the auxiliary structure:;and constructing a compensation expression for to perform evaluation as a residual query, wherein said residual query comprises at least a portion of said query not associated with said index or said materialized view.

21. The system of claim 20 that is implemented in a relational database management system.

22. The system of claim 20 wherein the structured document includes a set of nodes described by an expression tree.

23. The system of claim 20 wherein the structured document is an XML document.

24. The system of claim 20 wherein the pre-computed information includes precomputed XPath results (PXRs).

25. The system of claim 20 wherein the user query processing employs a query language that navigates path expressions.

26. The system of claim 25 wherein the query language employs XPath.

27. The system of claim 25 wherein the query language includes at least one of:

XQuery, SQL/XML, and XSLT.

28. The system of claim 20 wherein the identifier:

selectively executes a set of predetermined sequential rules to perform traversing of a tree of nodes; matches node data with the pre-computed information; and selects auxiliary structures that subsume portions of the user query.

29. The system of claim 20 wherein the compensation expression is an XPath predicate.

30. The system of claim 20 wherein the identifier builds a taxonomy of auxiliary structures.

31. The system of claim 30 wherein the identifier classifies compensation expressions to the taxonomy according to a predetermined set of values.

32. The system of claim 20 wherein the identifier handles at least one of: nested path expressions, nested predicates, value-based comparison predicates, conjunction, disjunction, all XPath axes, branches, and wild cards.

33. The system of claim 32 wherein the XPath axes include child, descendant, self, attribute, parent, and descendant-or-self.

34. The system of claim 20 wherein the identifier creates a mapping directed acyclic graph (DAG) that separately encodes a set of all containment mappings for each node.

35. The system of claim 34 wherein the identifier prunes the mapping DAG to remove invalid node pairs.

36. A computer-based system for querying a structured document, comprising:
an identifier of auxiliary structures including pre-computed information applicable to accelerate user query processing by detecting containment mappings between query expressions and expressions in the auxiliary structures,
wherein the auxiliary structures include a number of indexes, a number of partial XML indexes, and a number of materialized views;
a computer that computes computing compensation to perform index selection and materialized view matching to determine what portion of said query expressions are evaluated by said index and said materialized view; and
a query evaluator that finds the user query result by executing a rewritten query that exploits the pre-computed information to each detected containment mapping, wherein said query evaluator reports said user query result to said user,
wherein the identifier;
selectively executes a set of predetermined sequential rules to perform traversing of a tree of nodes; matches node data with the pre-computed information; and selects auxiliary structures that subsume portions of the user query,
wherein the node data includes axis data, test data, predicate data, and next step node data.

37. A computer-based system for querying a structured document, comprising:
an identifier of auxiliary structures including pre-computed information applicable to accelerate user query processing by detecting containment mappings between query expressions and expressions in the auxiliary structures,
wherein the auxiliary structures include a number of indexes, a number of partial XML indexes, and a number of materialized views;
a computer that computes computing compensation to perform index selection and materialized view matching to determine what portion of said query expressions are evaluated by said index and said materialized view; and
a query evaluator that finds the user query result by executing a rewritten query that exploits the pre-computed information to each detected containment mapping, wherein said query evaluator reports said user query result to said user,
wherein the identifier:
selectively executes a set of predetermined sequential rules to perform traversing of a tree of nodes; matches node data with the pre-computed information; and selects auxiliary structures that subsume portions of the user query,
wherein the identifier normalizes expression trees by moving predicate conditions into filter expressions before the identifier begins detecting.

38. A computer-based system for querying a structured document, comprising:
an identifier of auxiliary structures including pre-computed information applicable to accelerate user query processing by detecting containment mappings between query expressions and expressions in the auxiliary structures,
wherein the auxiliary structures include a number of indexes, a number of partial XML indexes, and a number of materialized views;
a computer that computes computing compensation to perform index selection and materialized view matching to determine what portion of said query expressions are evaluated by said index and said materialized view; and
a query evaluator that finds the user query result by executing a rewritten query that exploits the pre-computed information to each detected containment mapping, wherein said query evaluator reports said user query result to said user,
wherein the identifier creates a mapping directed acyclic graph (DAG) that separately encodes a set of all containment mappings for each node, and
wherein creating the mapping DAG is polynomial in terms of a size of expression trees.

39. A computer program product stored on a computer readable device tangibly embodying a program of computer-executable instructions to perform a method for querying a structured document, the method comprising:
identifying auxiliary structures including pre-computed information applicable to accelerate user query processing by detecting containment mappings between query expressions and expressions in the auxiliary structures,
wherein the auxiliary structures include a number of indexes, a number of partial XML indexes, and a number of materialized views;
computing compensation to perform index selection and materialized view matching to determine what portion of said query expressions are evaluated by said index and said materialized view;
finding the user query result by executing a rewritten query that exploits the precomputed information to each detected containment mapping; and
reporting said user query result to said user,
wherein said detecting of said containment mappings between said query expressions and said expressions in said auxiliary structures comprises matching node data of said query expressions with XPath expressions of said index and said materialized view, wherein said node data comprises axis data, test data, predicate data, and next XPath step node data.

40. The computer program product of claim 39 further comprising implementing the method in a relational database management system.

41. The computer program product of claim 39 wherein the structured document includes a set of nodes described by an expression tree.

42. The computer program product of claim 39 wherein the structured document is an XML document.

43. The computer program product of claim 39 wherein the pre-computed information includes pre-computed XPath results (PXRs).

44. The computer program product of claim 39 wherein the user query processing further comprises navigating path expressions with a query language.

45. The computer program product of claim 44 wherein the query, language employs XPath.

46. The computer program product of claim 44 wherein the query language includes at least one of: XQuery, SQL/XML, and XSLT.

47. The computer program product of claim 39 wherein the detecting further comprises:
selectively executing a set of predetermined sequential rules to perform traversing of a tree of nodes;
matching node data with the pre-computed information; and
selecting auxiliary structures that subsume portions of the user query.

48. The computer program product of claim 47 wherein the node data includes axis data, test data, predicate data, and next step node data.

49. The computer program product of claim 47 further comprising normalizing expression trees by moving predicate conditions into filter expressions before the identifying.

50. The computer program product of claim 39 wherein executing the rewritten query further comprises:
constructing a pushdown expression to perform evaluation with information in the auxiliary structure; and
constructing a compensation expression to perform evaluation as a residual query,
wherein said residual query comprises at least a portion of said query not associated with said index or said materialized view.

51. The computer program product of claim 50 wherein the compensation expression is an XPath predicate.

52. The computer program product of claim 50 further comprising building a taxonomy of auxiliary structures.

53. The computer program product of claim 52 further comprising classifying compensation expressions to the taxonomy according to a predetermined set of values.

54. The computer program product of claim 39 wherein the identifying handles at least one of:
nested path expressions, nested predicates, value-based comparison predicates, conjunction, disjunction, all XPath axes, branches, and wild cards.

55. The computer program product of claim 54 wherein the XPath axes include child, descendant, self, attribute, parent, and descendant-or-self.

56. The computer program product of claim 39 further comprising creating a mapping directed acyclic graph (DAG) that separately encodes a set of all Containment mappings for each node.

57. The computer program product of claim 56 wherein creating the mapping DAG is polynomial in terms of a size of expression trees.

58. The computer program product of claim 56 further comprising pruning the mapping DAG to remove invalid node pairs.

59. A computer-implemented method for querying a structured document, comprising:
identifying auxiliary structures including pre-computed information applicable to accelerate user query processing by detecting containment mappings between query expressions and expressions in the auxiliary structures,
wherein the auxiliary structures include a number of indexes, a number of partial XML indexes, and a number of materialized views;
computing compensation to perform index selection and materialized view matching to determine what portion of said query expressions are evaluated by said index and said materialized view;
finding the user query result by executing a rewritten query that exploits the pre-computed information to each detected containment mapping; and reporting said user query result to said user,
wherein said detecting of said containment mappings between said query expressions and said expressions in said auxiliary structures comprises matching node data of said query expressions with XPath expressions of said index and said materialized view, wherein said node data comprises axis data, test data, predicate data, and next XPath step node data.

60. A computer-based system for querying a structured document, comprising:
an identifier of auxiliary structures including pre-computed information applicable to accelerate user query processing by detecting containment mappings between query expressions and expressions in the auxiliary structures,
wherein the auxiliary structures include a number of indexes, a number of partial XML indexes, and a number of materialized views;
a computer that computes computing compensation to perform index selection and materialized view matching to determine what portion of said query expressions are evaluated by said index and said materialized view; and
a query evaluator that finds the user query result by executing a rewritten query that exploits the pre-computed information to each detected containment mapping, wherein said query evaluator reports said user query result to said user,
wherein said detecting of said containment mappings between said query expressions and said expressions in said auxiliary structures comprises matching node data of said query expressions with XPath expressions of said index and said materialized view, wherein said node data comprises axis data, test data, predicate data, and next XPath step node data.

* * * * *